US012744213B2

(12) United States Patent
Liu et al.

(10) Patent No.: US 12,744,213 B2
(45) Date of Patent: Sep. 22, 2026

(54) NEGATIVE ELECTRODE PLATE, ELECTROCHEMICAL ENERGY STORAGE APPARATUS AND ELECTRONIC APPARATUS

(71) Applicant: ZHUHAI COSMX BATTERY CO., LTD., Zhuhai (CN)

(72) Inventors: Chunyang Liu, Zhuhai (CN); Ruofan Chen, Zhuhai (CN); Suli Li, Zhuhai (CN)

(73) Assignee: ZHUHAI COSMX BATTERY CO., LTD., Zhuhai (CN)

( * ) Notice: Subject to any disclaimer, the term of this patent is extended or adjusted under 35 U.S.C. 154(b) by 536 days.

(21) Appl. No.: 18/456,004

(22) Filed: Aug. 25, 2023

(65) Prior Publication Data

US 2023/0402603 A1 Dec. 14, 2023

Related U.S. Application Data

(63) Continuation of application No. PCT/CN2021/094693, filed on May 19, 2021.

(51) Int. Cl.

| | |
|---|---|
| ***H01M 4/583*** | (2010.01) |
| ***H01M 4/02*** | (2006.01) |
| ***H01M 4/04*** | (2006.01) |
| ***H01M 4/133*** | (2010.01) |
| ***H01M 4/134*** | (2010.01) |
| ***H01M 4/36*** | (2006.01) |
| ***H01M 4/38*** | (2006.01) |
| ***H01M 10/0525*** | (2010.01) |

(52) U.S. Cl.

CPC ......... *H01M 4/583* (2013.01); *H01M 4/0404* (2013.01); *H01M 4/364* (2013.01); *H01M 4/366* (2013.01); *H01M 4/386* (2013.01); *H01M 10/0525* (2013.01); *H01M 2004/021* (2013.01); *H01M 2004/027* (2013.01); *H01M 4/133* (2013.01); *H01M 4/134* (2013.01)

(58) Field of Classification Search

None

See application file for complete search history.

(56) References Cited

U.S. PATENT DOCUMENTS

| | | | | |
|---|---|---|---|---|
| 5,753,387 A * | 5/1998 | Takami | H01M 4/583 | 423/448 |
| 2003/0129497 A1* | 7/2003 | Yamamoto | H01M 4/40 | 429/231.95 |
| 2005/0260497 A1* | 11/2005 | Kumashiro | H01M 10/4207 | 429/188 |
| 2006/0068293 A1* | 3/2006 | Kim | H01M 10/0569 | 429/231.95 |
| 2008/0057401 A1* | 3/2008 | Mori | H01M 10/0569 | 429/303 |
| 2019/0181434 A1 | 6/2019 | Lee et al. | | |
| 2020/0395600 A1* | 12/2020 | Chen | H01M 50/46 | |

FOREIGN PATENT DOCUMENTS

| | | | | |
|---|---|---|---|---|
| CN | 102332604 A | 1/2012 | | |
| CN | 102403497 A | 4/2012 | | |
| CN | 102723492 A | 10/2012 | | |
| CN | 103094528 A | 5/2013 | | |
| CN | 103633306 A | 3/2014 | | |
| CN | 108321392 A | 7/2018 | | |
| CN | 108963254 A | 12/2018 | | |
| CN | 109301160 A | 2/2019 | | |
| CN | 108963254 B | 7/2020 | | |
| CN | 111640940 A | 9/2020 | | |
| CN | 112271283 A | 1/2021 | | |
| CN | 108693254 B | 3/2021 | | |
| CN | 115377361 A | 11/2022 | | |
| CN | 115377369 A | 11/2022 | | |
| CN | 115377370 A | 11/2022 | | |
| JP | H08153514 A | 6/1996 | | |
| JP | 2008059999 A | 3/2008 | | |
| JP | 2011204903 A | 10/2011 | | |
| JP | 2013089327 A | 5/2013 | | |
| JP | 2015050280 A | 3/2015 | | |
| JP | 2017062911 A | 3/2017 | | |
| JP | 2017073325 A | 4/2017 | | |
| JP | 2018022656 A | 2/2018 | | |
| JP | 6303278 B2 | 4/2018 | | |
| JP | 2018098199 A | * | 6/2018 | H01M 10/052 |

(Continued)

OTHER PUBLICATIONS

Yin et al.; "The Power-Energy Coupling Effect of Mixed Hard-Carbon/Graphite Anode"; Journal of Materials Science and Chemical Engineering, 2021, 9, 16-31 (Year: 2021).*

Machine Translation of CN108963254A (Year: 2018).*

Machine Translation of JP-2018098199-A (Year: 2018).*

Adam et al.; "Fabrication, characterization, and applications of hard carbons: A comprehensive review"; Journal of Power Sources 652 (2025) 237674; 25 pages. (Year: 2025).*

Notification to Grant Patent Right for Invention issued in counterpart Korean Patent Application No. 10-2023-7029646, dated Sep. 23, 2025.

Office Action issued in counterpart European Patent Application No. EP 21940142.9, dated Jun. 3, 2025.

(Continued)

*Primary Examiner* — Gregg Cantelmo

(74) *Attorney, Agent, or Firm* — Westbridge IP LLC

(57) ABSTRACT

Disclosed are a negative electrode plate, an electrochemical energy storage apparatus and an electronic apparatus comprising the negative electrode plate. A negative electrode active material of the negative electrode plate includes a first amorphous carbon material. An interlayer spacing d002 of the first amorphous carbon material is greater than 0.34 nm, and an average pore diameter of pores of the first amorphous carbon material ranges from 2 nm to 20 nm. The negative electrode plate can help improve energy density of a lithium-ion battery and suppress expansion of an electrochemical energy storage apparatus during cycling.

20 Claims, 6 Drawing Sheets

(56) References Cited

FOREIGN PATENT DOCUMENTS

| | | | |
|---|---|---|---|
| KR | 20050112927 | A | 12/2005 |
| WO | 2015181940 | A1 | 12/2015 |
| WO | 2018225515 | A1 | 12/2018 |
| WO | 2019013395 | A1 | 1/2019 |

OTHER PUBLICATIONS

European Search Report issued in counterpart European Patent Application No. EP 21940142.9, dated May 28, 2024.

Notice of Reasons for Refusal issued in counterpart Japanese Patent Application No. 2023-554777, dated Dec. 3, 2024.

International Search Report and Written Opinion issued in corresponding PCT Application No. PCT/CN2021/094693, dated Jan. 27, 2022.

Communication about intention to grant a European patent issued in counterpart European Patent Application No. EP 21940142.9, dated Nov. 12, 2025.

First Office Action issued in counterpart Chinese Patent Application No. 202180094214.8, dated Apr. 28, 2026.

* cited by examiner

NEGATIVE ELECTRODE PLATE, ELECTROCHEMICAL ENERGY STORAGE APPARATUS AND ELECTRONIC APPARATUS

CROSS-REFERENCE TO RELATED APPLICATIONS

This application is a continuation of International Application No. PCT/CN2021/094693, filed on May 19, 2021, the disclosure of which is hereby incorporated by reference in its entirety.

TECHNICAL FIELD

The present disclosure relates to a negative electrode plate, and in particular to a negative electrode plate, an electrochemical energy storage apparatus and an electronic apparatus comprising the negative electrode plate, belonging to the field of battery technologies.

BACKGROUND

Lithium-ion batteries are widely used electrochemical energy storage apparatuses, and may provide continuous and stable power. Currently, graphite is a negative electrode active material used in commercial lithium batteries, which is widely used at low price. As a negative electrode active material, graphite has lithium intercalation potential close to 0V (lithium metal potential), and thus lithium dendrites easily occur. The occurrence of lithium dendrites causes a risk of thermal runaway. In addition, with continuous charging and discharging of a battery, cell thickness increases continuously. In order to cope with the increase of the cell thickness, an electronic device needs to reserve a thickness expansion space in advance, which is not good for portability of the electronic device, and also reduces volumetric energy density of the electronic device. In addition, a theoretical capacity of graphite is 372 mAh/g, with an obvious upper limit of capacity, and thus further increase of volumetric energy density is limited.

SUMMARY

The present disclosure provides a negative electrode plate, lithium dendrites not easily occur for the negative electrode plate, and the negative electrode plate has a significantly low thickness expansion rate after cycling. In addition, the negative electrode plate helps significantly improve energy density of a lithium-ion battery.

The present disclosure provides an electrochemical energy storage apparatus, and the electrochemical energy storage apparatus includes the negative electrode plate. Therefore, the electrochemical energy storage apparatus not only has good energy density, but also has an advantage of low expansion after long-term cycle.

The present disclosure further provides an electronic apparatus, and the electronic apparatus includes the electrochemical energy storage apparatus. Therefore, the electronic apparatus has a long endurance time and high customer satisfaction.

The present disclosure provides a negative electrode plate. The negative electrode plate includes a current collector and a negative electrode active layer disposed on at least one function surface of the current collector, and a negative electrode active material of the negative electrode active layer includes a first amorphous carbon material; and an interlayer spacing d002 of the first amorphous carbon material is greater than 0.34 nm, and an average pore diameter of pores of the first amorphous carbon material ranges from 2 nm to 20 nm.

The negative electrode active material of the negative electrode plate in the present disclosure includes the first amorphous carbon material, and the first amorphous carbon material has a relatively large interlayer spacing and a special average pore diameter of pores. Therefore, very small thickness expansion of the negative electrode plate is caused by intercalation and deintercalation of lithium ions, and may be almost ignored. In addition, the first amorphous carbon material has a relatively high capacity per gram, may meet a relatively high energy density, and a design of a volumetric energy density of ED 800 Wh/L. Furthermore, using the first amorphous carbon material having a high lithium intercalation potential as a negative electrode active material may reduce a risk of lithium deintercalation of the negative electrode plate.

In an implementation, the first amorphous carbon material has a capacity per gram of not less than 470 mAh/g.

In an implementation, an average particle size $d_1$ of the first amorphous carbon material ranges from 3 μm to 15 μm; and/or

- a specific surface area of the first amorphous carbon material ranges from 2.8 $m^2/g$ to 19 $m^2/g$; and/or
- a Raman spectrum Id/Ig peak ratio of the first amorphous carbon material is greater than 1.0; and/or
- an X-ray diffraction pattern of the first amorphous carbon material includes a diffraction peak with 2θ being less than 26 degrees, and an intensity of the diffraction peak is less than 20000; and/or, a full width at half maximum of the diffraction peak is greater than 1.2 degrees.

In an implementation, the negative electrode active material further includes a second amorphous carbon material, where the second amorphous carbon material is in a shape of spherical particles.

An average particle size $d_2$ of the spherical particles ranges from 0.2 μm to 4 μm.

In an implementation, a specific surface area of the second amorphous carbon material ranges from 2 $m^2/g$ to 23 $m^2/g$.

In an implementation, the negative electrode active material includes a first mixture of the first amorphous carbon material and the second amorphous carbon material.

In an implementation, a mass percentage of the second amorphous carbon material in the first mixture is not less than 3%.

In an implementation, the negative electrode active layer includes a first amorphous carbon layer and a second amorphous carbon layer that are stacked, where the first amorphous carbon layer includes the first amorphous carbon material, and the second amorphous carbon layer includes the second amorphous carbon material.

In an implementation, the negative electrode active layer includes the first amorphous carbon layer close to the current collector and the second amorphous carbon layer away from the current collector.

In an implementation, a thickness $H_1$ of the first amorphous carbon layer and a thickness $H_2$ of the second amorphous carbon layer satisfy the following relationship:

$$0.3(H_1+H_2) \geq H_2 \geq D_2$$

where $D_2$ denotes a maximum particle size of the second amorphous carbon material.

In an implementation, the negative electrode active material includes a second mixture of the first amorphous carbon material and a graphite material.

In an implementation, a ratio of an average particle size $d_3$ of the graphite material to an average particle size $d_1$ of the first amorphous carbon material is (0.95-8.3):1.

In an implementation, a mass percentage of the first amorphous carbon material in the second mixture is not less than 28%.

In an implementation, the negative electrode active layer includes a first amorphous carbon layer and a graphite layer that are stacked, where the first amorphous carbon layer includes a first amorphous carbon material and the graphite layer includes a graphite material.

In an implementation, a thickness $H_1$ of the first amorphous carbon layer and a thickness $H_3$ of the graphite layer satisfy the following relationship:

$$(H_1+H_3)-0.39D_3 \geq H_1 \geq 0.63d_1$$

where $D_1$ denotes a maximum particle size of the first amorphous carbon material, and $D_3$ denotes a maximum particle size of the graphite material.

In an implementation, the negative electrode active layer includes graphite layer close to the current collector and the first amorphous carbon layer away from the current collector.

In an implementation, the graphite material includes graphite particles and/or graphite core-shell particles, and the graphite core-shell particles are constituted by a core formed by graphite and a shell covering at least part of a surface of the core.

In an implementation, the negative electrode active material includes a third mixture of the first amorphous carbon material and a silicon-based material.

In an implementation, a mass percentage of the silicon-based material in the third mixture ranges from 0.3% to 20%.

In an implementation, the negative electrode active layer includes a first amorphous carbon layer and a silicon-based active layer that are stacked, the first amorphous carbon layer includes the first amorphous carbon material, and the silicon-based active layer includes the silicon-based material.

In an implementation, a thickness $H_1$ of the first amorphous carbon layer and a thickness $H_4$ of the silicon-based active layer satisfy the following relationship:

$$H_4 \leq 0.2(H_1+H_4).$$

In an implementation, the silicon-based material is selected from at least one of a silicon material, a silicon oxide material (for example, SiO), and a silicon-carbon composite material (for example, SiC).

The present disclosure further provides an electrochemical energy storage apparatus, and the electrochemical energy storage apparatus includes the negative electrode plate according to any one of the foregoing implementations.

The electrochemical energy storage apparatus of the present disclosure includes the negative electrode plate, and therefore has good safety performance and energy density.

The present disclosure further provides an electronic apparatus, and the electronic apparatus includes the electrochemical energy storage apparatus.

The electronic apparatus in the present disclosure includes the electrochemical energy storage apparatus, which not only has a good endurance capability, but also has characteristics of a lower thickness and a lighter weight. Therefore, on the basis of meeting usage requirements of a conventional electronic product, the electronic apparatus may also meet requirements of a next-generation wearable device.

DETAILED DESCRIPTION OF THE EMBODIMENTS

Figure 1:
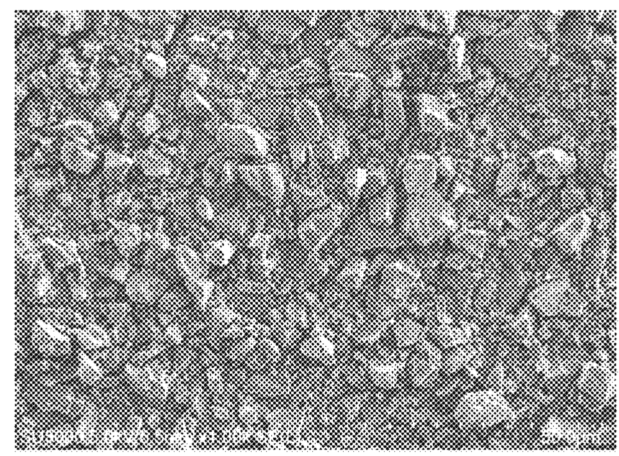
FIG. 1 is an SEM graph of a first amorphous carbon material in Example 1.

To make the objectives, technical solutions, and advantages of the present disclosure clearer, the following clearly describes the technical solutions in the embodiments of the present disclosure with reference to the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

A first aspect of the present disclosure provides a negative electrode plate. The negative electrode plate includes a current collector and a negative electrode active layer disposed on at least one function surface of the current collector, and a negative electrode active material of the negative electrode active layer includes a first amorphous carbon material. An interlayer spacing (which is usually referred as d002) of the first amorphous carbon material is greater than 0.34 nm, and an average pore diameter of pores of the first amorphous carbon material ranges from 2 nm to 20 nm.

The "average pore diameter of pores" in the present disclosure is defined as an average pore size of pores on a surface and inside of an amorphous carbon material.

The negative electrode plate in the present disclosure includes a negative electrode current collector and a negative electrode active layer disposed on at least one function surface of the current collector, where the function surface refers to the largest and opposite surfaces, for the negative electrode active layer to be coated, of the current collector. The negative electrode active layer may be disposed on one or two function surfaces of the current collector. A thickness of the negative electrode active layer is not limited in the present disclosure, for example, may range from 40 μm to 120 μm, for example, 43 μm, 59 μm, 65.1 μm, 69.6 μm, 81.2 μm, and 113.6 μm.

The negative electrode active material of the negative electrode active layer includes a first amorphous carbon material. Since the first amorphous carbon material has a special interlayer spacing d002 and a special average pore diameter of pores, relatively large pores exist inside the first amorphous carbon material. During long-term charging and discharging, an inner space of the first amorphous carbon material helps buffer expansion of an electrochemical energy storage apparatus, reducing thickness expansion of the electrochemical energy storage apparatus caused during long-term disclosure, and improving safety performance. Specifically, after the negative electrode plate is cycled for 50 T, the negative electrode plate has a thickness change rate of less than 5% in the condition of being fully charged.

In addition, the first amorphous carbon material has performance of suppressing expansion, so as to avoid the current approach of improving safety performance of the electrochemical energy storage apparatus by reserving an expansion space for the electrochemical energy storage apparatus, thereby helping further improve volumetric energy density of the electrochemical energy storage apparatus.

It is worth emphasizing that the first amorphous carbon material not only can suppress expansion of the electrochemical energy storage apparatus, but also has an advantage of improving energy density of the electrochemical energy storage apparatus.

The first amorphous carbon material is a carbon material having a disordered structure of a graphite layer. Generally, an amorphous carbon material has a high capacity per gram, and has no theoretical upper limit for the capacity per gram.

The first amorphous carbon material is a small-sized graphite layered structure exhibiting disordered arrangement and a porous structure. Specifically, an interlayer spacing d002 of greater than 0.34 nm and an average pore diameter of 2-20 nm (for example, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm) of pores makes the first amorphous carbon material have high capacity performance. The capacity of an amorphous carbon material higher than that of graphite mainly originates from a highly disordered structure, and this structure provides a large number of lithium storage sites. In addition, pores of the amorphous carbon material itself may help increase lithium storage sites.

Therefore, the negative electrode plate of the present disclosure not only helps improve the energy density of the electrochemical energy storage apparatus, but also can effectively improve performance of suppressing expansion of thickness of the electrochemical energy storage apparatus.

In addition, since the amorphous carbon material in the negative electrode plate of the present disclosure has a relatively high lithium intercalation potential, precipitation of lithium dendrites can be effectively suppressed, and a negative impact of lithium dendrites on cycle performance and safety performance of the electrochemical energy storage apparatus is also avoided.

In a specific implementation, a first amorphous carbon material in the present disclosure has a capacity per gram of not less than 470 mAh/g.

Further, an average particle size $d_1$ of the first amorphous carbon material in the negative electrode plate of the present disclosure ranges from 3 μm to 15 μm (for example, 3 μm, 5 μm, 8 μm, 10 μm, 12 μm, 15 μm). The larger the average particle size $d_1$ of the first amorphous carbon material, the smaller a specific surface area of the first amorphous carbon material, which is not good for conduction and intercalation of lithium ions. However, if the average particle size $d_1$ is too small, the specific surface area of the first amorphous carbon material may be significantly increased, a contact area between an electrolytic solution and the first amorphous carbon material is increased, and a large amount of the electrolytic solution is consumed, thereby reducing the cycle performance of the electrochemical energy storage apparatus. Therefore, in the present disclosure, the average particle size $d_1$ of the first amorphous carbon material ranges from 3 μm to μm, and may further range from 5 μm to 12 μm. Specifically, in a process of preparing the negative electrode plate, the first amorphous carbon material with an average particle size $d_1$ ranging from 3 μm to 15 μm may be selected by using a laser particle size analyzer. After the electrochemical energy storage apparatus is assembled, the foregoing average particle size of the first amorphous carbon material may also be measured by a focused ion beam-3D scanning electron microscopy (FIB-SEM).

Further, the specific surface area of the first amorphous carbon material in the negative electrode plate of the present disclosure ranges from 2.8 $m^2/g$ to 19 $m^2/g$ (for example, 2.8 $m^2/g$, 5 $m^2/g$, 8 $m^2/g$, 10 $m^2/g$, 12 $m^2/g$, 15 $m^2/g$, 19 $m^2/g$). The specific surface area will not suppress intercalation and transmission capability of lithium ions, so that fast charging performance of the electrochemical energy storage apparatus is improved, and the electrochemical energy storage apparatus can have sufficient electrolyte in a long-term cycle process, thereby further improving cycle performance of the electrochemical energy storage apparatus by further maintaining the transmission capability of lithium ions.

According to the research of the present disclosure, a Raman spectrum Id/Ig peak ratio of the first amorphous carbon material in the present disclosure is greater than 1.0; and an X-ray diffraction pattern includes a diffraction peak with 20 being less than 26 degrees, where an intensity of the diffraction peak is less than 20000, and further a full width at half maximum of the diffraction peak is greater than 1.2 degrees (for example, 1.2 degrees, 2 degrees, 3 degrees, 4 degrees, 5 degrees, 6 degrees, 7 degrees, 8 degrees, 9 degrees, 10 degrees, 11 degrees, 12 degrees, 13 degrees, 14 degrees, 15 degrees). For example, 20 of the diffraction peak is 25.48 degrees, 23.23 degrees or 22.58 degrees; and peak intensity of the diffraction peak may be, for example, 8000, 9000, or 18000.

The first amorphous carbon material in the negative electrode plate of the present disclosure may be obtained by performing a carbonization process on an asphaltene base material, a biomass raw material, or a polymer raw material.

The negative electrode active material of the negative electrode plate of the negative electrode active layer of the present disclosure includes the foregoing first amorphous carbon material. Therefore, with a significant lithium intercalation capacity, the negative electrode plate is not easy to precipitate lithium dendrites and has a low thickness expansion rate during cycling.

As mentioned above, in the present disclosure, in addition to the first amorphous carbon material, the negative electrode active material of the negative electrode active layer of the negative electrode plate may also include another negative electrode active material.

In an implementation, the negative electrode active material of the negative electrode active layer further includes a second amorphous carbon material, where the second amorphous carbon material is in a shape of spherical particles, and an average particle size $d_2$ of the spherical particles ranges from 0.2 μm to 4 μm (for example, 0.2 μm, 0.5 μm, 1 μm, 2 μm, 3 μm, 4 μm). Specifically, in the process of preparing the negative electrode plate, the second amorphous carbon material with an average particle size $d_2$ ranging from 0.2 μm to 4 μm may be selected by using a laser particle size analyzer. After the electrochemical energy storage apparatus is assembled, the foregoing average particle size of the second amorphous carbon material may also be measured by a focused ion beam-3D scanning electron microscopy (FIB-SEM).

Specifically, macroscopic representation of the second amorphous carbon material may be a powdery material formed by particles having a spherical structure with an average particle size $d_2$ ranging from 0.2 μm to 4 μm. According to the research of the present disclosure, a Raman (Raman) spectrum Id/Ig peak ratio of the second amorphous carbon material (or referred to as a spherical carbon material) ranges from 0.5 to 1.5 (for example, 0.5, 0.8, 1, 1.2, 1.5). In the result of the X-ray diffraction (XRD) analysis, a peak position of the diffraction peak is less than 26.5 degrees, so that the second amorphous carbon material is a carbon-based active substance having a low temperature. Compared with an amorphous carbon material with irregular morphologies, particles of the second amorphous carbon material have a spherical structure with a small particle size (the average particle size $d_2$ ranges from 0.2 μm to 4 μm), and have a large number of end surfaces, which facilitates de-intercalation/transmission of lithium ions; therefore, the second amorphous carbon material has good low-temperature dynamic performance, and specifically, a lower limit voltage during low-temperature discharge is high.

Further, a specific surface area of the second amorphous carbon material ranges from 2 $m^2/g$ to 23 $m^2/g$ (for example, 2 $m^2/g$, 4 $m^2/g$, 8 $m^2/g$, 10 $m^2/g$, 12 $m^2/g$, 15 $m^2/g$, 20 $m^2/g$), which helps further improve low-temperature performance of the electrochemical energy storage apparatus. Further, the specific surface area of the second amorphous carbon material ranges from 4 $m^2/g$ to 15 $m^2/g$.

Therefore, when the negative electrode active material in the negative electrode plate of the present disclosure includes both the first amorphous carbon material and the second amorphous carbon material, a lithium-ion battery has high energy density and a low expansion rate, and also has relatively good low-temperature dynamic performance, so that electrical performance of the lithium-ion battery is better, which helps further expand an disclosure range of the lithium-ion battery.

Specific forms of the first amorphous carbon material and the second amorphous carbon material in the negative electrode plate are not limited in the present disclosure. For example, the negative electrode active material in the negative electrode active layer includes a first mixture of the first amorphous carbon material and the second amorphous carbon material. Further, a mass percentage of the second amorphous carbon material in the first mixture is not less than 3%.

Alternatively, the negative electrode active layer includes a first amorphous carbon layer and a second amorphous carbon layer that are stacked, where the first amorphous carbon layer includes the first amorphous carbon material, and the second amorphous carbon layer includes the second amorphous carbon material.

Further, when the negative electrode active layer includes the first amorphous carbon layer and the second amorphous carbon layer that are stacked, the first amorphous carbon layer is located between a function surface of the current collector and the second amorphous carbon layer.

Further, a thickness $H_1$ of the first amorphous carbon layer and a thickness $H_2$ of the second amorphous carbon layer satisfy the following relationship:

$$0.3(H_1+H_2) \geq H_2 \geq D_2$$

where $D_2$ denotes a maximum particle size of the second amorphous carbon material.

$D_2$ may be obtained through detection by using a laser particle size analyzer. Herein, the thickness $H_1$ of the first amorphous carbon layer and the thickness $H_2$ of the second amorphous carbon layer mean thickness of the first amorphous carbon layer and thickness of the second amorphous carbon layer on one function surface, respectively.

The inventors find that when $H_1$ and $H_2$ satisfy the foregoing relationship, the electrochemical energy storage apparatus has both good low-temperature performance and low thickness expansion rate.

In another implementation, the negative electrode active material further includes a graphite material.

It can be understood that, since the first amorphous carbon material has a special average pore diameter of pores and an interlayer spacing d002, relatively large pores exist inside the first amorphous carbon material. During long-term charging and discharging, when the graphite material in the negative electrode plate expands, the pores inside the first amorphous carbon material may provide a space for the expansion of the graphite material, thereby greatly suppressing expansion of the electrochemical energy storage apparatus caused by expansion of the negative electrode active layer.

The first amorphous carbon material not only can provide an expansion space for the graphite material, but also can avoid excessive expansion of the graphite material to some extent. Structural stability of the graphite material is maintained, so that ability of lithium ions to be intercalated into graphite is ensured, and a precipitation probability of lithium dendrites in a graphite layer material is reduced, further ensuring cycle performance and safety performance of the electrochemical energy storage apparatus.

Specific forms of the first amorphous carbon material and the graphite material in the negative electrode plate are not limited in the present disclosure. For example, the negative electrode active material in the negative electrode active layer includes a second mixture of the first amorphous carbon material and the graphite material.

Further, a ratio of an average particle size $d_3$ of the graphite material to an average particle size $d_1$ of the first amorphous carbon material in the second mixture is (0.95-8.3):1 (for example, 1:1, 2:1, 3:1, 4:1, 5:1, 6:1, 7:1, 8:1). Specifically, a high specific surface area of the graphite material facilitates infiltration of the electrolyte, thereby ensuring efficient transmission of lithium ions, and further avoiding precipitation of lithium dendrites in the graphite material. As mentioned above, d 3 may be measured by using a laser particle size analyzer or a focused ion beam-3D scanning electron microscopy (FIB-SEM).

The inventors find that when a ratio of a mass of the first amorphous carbon material to a sum of masses of the first amorphous carbon material and the graphite material is no less than 28%, the negative electrode plate has better performance in improving energy density and suppressing expansion of thickness of the electrochemical energy storage apparatus, and especially can reduce the expansion of the thickness more significantly.

Alternatively, the negative electrode active layer includes a first amorphous carbon layer and a graphite layer that are stacked, where the first amorphous carbon layer includes a first amorphous carbon material and the graphite layer includes a graphite material.

Further, a thickness $H_1$ of the first amorphous carbon layer and a thickness $H_3$ of the graphite layer satisfy the following relationship:

$$(H_1+H_3)-0.39D_3 \geq H_1 \geq 0.63D_1$$

where $D_1$ denotes a maximum particle size of the first amorphous carbon material, and $D_3$ denotes a maximum particle size of the graphite material. The inventors find that when the maximum particle size $D_1$ of the first amorphous carbon material, the maximum particle size $D_3$ of the graphite material, the thickness $H_1$ of the first amorphous carbon layer, and the thickness $H_3$ of the graphite layer have the foregoing matching relationship, an expansion rate of the negative electrode plate is further reduced.

It should be noted that both $D_1$ and $D_3$ may be measured and obtained by using a laser particle size analyzer.

In a preferred implementation, the graphite layer is located between a current collector and an amorphous carbon layer, facilitating further suppression of expansion of the graphite layer by the first amorphous carbon layer.

The graphite material in the negative electrode plate of the present disclosure may be a conventional graphite-based negative electrode active material in the field, or may be constituted by a core formed by graphite and a shell covering at least part of a surface of the core. The graphite material of the core-shell structure may be prepared according to a conventional method in the art, for example, by using a carbon coating method.

Comparatively, using the graphite material having the foregoing core-shell structure as the negative electrode active material facilitates cooperation with the first amorphous carbon material, and an effect of improving energy density of the electrochemical energy storage apparatus and suppressing thickness expansion can be improved. In some preferred implementations, the shell of the graphite material of the foregoing core-shell structure includes an amorphous carbon material, specifically, the graphite material of the core-shell structure may be a structure in which graphite is used as a core and an amorphous carbon material is used as a shell. It should be noted that, the amorphous carbon material in the shell material may be the first amorphous carbon material mentioned in the present disclosure, or may be another amorphous carbon material.

In another implementation, the negative electrode active material further includes a silicon-based material. During long-term charging and discharging of the electrochemical energy storage apparatus, the special interlayer spacing and pore size of the first amorphous carbon material provide a buffer for expansion of the silicon-based material in the negative electrode plate, so that thickness expansion of the electrochemical energy storage apparatus due to the expansion of the silicon-based material can be reduced to some extent. Moreover, the first amorphous carbon material has a higher hardness relative to the silicon-based material, so that stress of the silicon-based material is affected, and a probability of excessive expansion of the silicon-based material is reduced. In addition to being able to alleviate the expansion of the silicon-based material, an internal space of the amorphous carbon material having special pores and interlayer spacing in the negative electrode plate of the present disclosure also helps buffer expansion of the electrochemical energy storage apparatus and reduce thickness expansion of the electrochemical energy storage apparatus caused due to long-term application.

The first amorphous carbon material is capable of relieving the expansion of the silicon-based material so as to promote efficient development of the feature of high energy density of the silicon-based material. In addition, the first amorphous carbon material also helps resolve a problem that internal resistance of a lithium-ion battery is too low due to conductivity of the silicon-based material, thereby improving rate performance of the lithium-ion battery to some extent.

Specific forms of the first amorphous carbon material and the silicon-based material in the negative electrode plate are not limited in the present disclosure. For example, the negative electrode active material in the negative electrode active layer includes a third mixture of the first amorphous carbon material and the silicon-based material. Further, the inventors find that when a mass percentage of the silicon-based material in the third mixture ranges from 0.3% to 20% (for example, 0.3%, 1%, 2%, 5%, 8%, 10%, 12%, 15%, 20%), thermodynamic performance of the electrochemical energy storage apparatus is further improved, for example, the electrochemical energy storage apparatus has better energy density and performance of suppressing expansion.

Alternatively, the negative electrode active layer includes a first amorphous carbon layer and a silicon-based active layer that are stacked, the first amorphous carbon layer includes the first amorphous carbon material, and the silicon-based active layer includes the silicon-based material. The first amorphous carbon layer and the silicon-based active layer may be stacked in a manner that the first amorphous carbon layer is close to the current collector and the silicon-based active layer is away from the current collector, or that the first amorphous carbon layer is away from the current collector and the silicon-based active layer is close to the current collector. Preferably, when the first amorphous carbon layer is away from the current collector and the silicon-based active layer is close to the current collector, the energy density of the electrochemical energy storage apparatus is improved and expansion is suppressed.

Further, when the negative electrode active layer includes a first amorphous carbon layer and a silicon-based active layer that are stacked, the thickness $H_1$ of the first amorphous carbon layer and a thickness $H_4$ of the silicon-based active layer satisfy the following relationship:

$$H_4 \leq 0.2(H_1+H_4)$$

In the present disclosure, the silicon-based material is selected from at least one of a silicon material, a silicon oxide material, and a silicon-carbon composite material.

A porosity of the negative electrode plate in the present disclosure ranges from 35% to 49%. Specifically, the porosity means a porosity of the negative electrode active layer of the negative electrode plate. The inventors find that when the porosity of the negative electrode plate is in the range, rapid infiltration of the electrolyte is facilitated, cycle performance of the lithium-ion battery is improved, and discharge performance with high capacity and high rate is always achieved. However, when the porosity is too high, it means that an amount the negative electrode active material in the negative electrode active layer is too small, so that the energy density of the lithium-ion battery may be adversely affected.

Specifically, a compacted density of the negative electrode plate in the present disclosure may be controlled to range from 1.02 g/cm$^3$ to 1.7 g/cm$^3$ (for example, 1.1 g/cm$^3$, 1.2 g/cm$^3$, 1.3 g/cm$^3$, 1.4 g/cm$^3$, 1.5 g/cm$^3$, 1.6 g/cm$^3$, 1.7 g/cm$^3$), so that volumetric energy density of the electrochemical energy storage apparatus is further optimized. Further, a surface density of the negative electrode plate in the present disclosure ranges from 3.25 g/cm$^2$ to 13.25 g/cm$^2$ (for example, 5 g/cm$^2$, 8 g/cm$^2$, 10 g/cm$^2$, 12 g/cm$^2$).

In the negative electrode plate of the present disclosure, the negative electrode active layer includes a conductive agent and a binder in addition to the negative electrode active material. The conductive agent may be selected from at least one of superconducting carbon black, acetylene black, ketjen black, carbon fiber, and graphene; and the binder may be selected from at least one of carboxymethyl cellulose (CMC), styrene-butadiene rubber (SBR), polyvinyl chloride, carboxylated polyvinyl chloride, polyvinyl fluoride, polymer containing ethylene oxide, polyvinylpyrrolidone, polyurethane, polytetrafluoroethylene, polyvinylidene fluoride, polyethylene, polypropylene, polyamide-imide, polyvinyl alcohol, sodium polyacrylate.

In some implementations, the negative electrode active layer includes 95-99% (for example, 95%, 96%, 97%, 98%, 99%) negative electrode active material, 0.1-2.3% (for example, 0.5%, 0.8%, 1%, 1.5%, 2%) conductive agent, and 0.5-3.7% (for example, 0.5%, 1%, 1.5%, 2%, 2.5%, 3%, 3.5%) binder according to mass percentage.

A second aspect of the present disclosure provides an electrochemical energy storage apparatus, and the electrochemical energy storage apparatus includes the foregoing negative electrode plate. The electrochemical energy storage apparatus of the present disclosure includes the foregoing negative electrode plate, so that energy density, safety performance, and fast charging performance are good.

Further, when the negative electrode active material of the negative electrode active layer in the negative electrode plate includes a second mixture of a first amorphous carbon material and a graphite material, a unit thickness capacity of the negative electrode plate in an electrochemical energy storage apparatus ranges from 26.9 mAh/μm to 123 mAh/μm (30 mAh/μm, 50 mAh/μm, 60 mAh/μm, 80 mAh/μm, 100 mAh/μm, 110 mAh/μm). Specifically, the unit thickness capacity of the negative electrode plate is a ratio of an actual capacity of the electrochemical energy storage apparatus to a thickness of the negative electrode active layer of the negative electrode plate in the electrochemical energy storage apparatus. For example, when the electrochemical energy storage apparatus is a lithium-ion battery, the unit thickness capacity of the negative electrode plate is a ratio of an actual capacity of the lithium-ion battery to a thickness of a negative electrode active layer of a negative electrode plate in the lithium-ion battery.

The electrochemical energy storage apparatus further includes a positive electrode plate, and the positive electrode plate includes a positive electrode current collector and a positive electrode active layer disposed on at least one function surface of the positive electrode current collector. The function surface refers to the largest and opposite surfaces, for the positive electrode active layer to be coated, of the current collector. The positive electrode active layer generally includes a positive electrode active material, a conductive agent, and a binder. The positive electrode active material may be selected from at least one of lithium cobalt oxide, lithium manganate, lithium nickel oxide, lithium nickel cobalt manganese, lithium iron phosphate, lithium manganese iron phosphate, lithium vanadium phosphate, lithium vanadyl phosphate, a lithium-rich manganese-based material, and lithium nickel cobalt aluminate. Lithium nickel cobalt manganate (NCM) may include, for example, at least one of NCM 111, NCM 523, NCM 532, NCM 622, and NCM 811; the conductive agent may be selected from at least one of acetylene black (AB), conductive carbon black (Super-P), ketjen black (KB), carbon nanotube (CNT), and graphene; and the binder may be selected from at least one of polyvinylidene fluoride (PVDF), sodium carboxymethyl cellulose (CMC-Na), and sodium alginate (SA).

Further, a thickness ratio of the negative electrode active layer to the positive electrode active layer is (0.93-1.68):1 (for example, 1:1, 1.2:1, 1.3:1, 1.4:1, 1.5:1, 1.6:1). Specifically, the thickness ratio means a thickness ratio at zero electrical state. In the foregoing range, the negative electrode plate can provide more lithium intercalation sites to intercalate lithium ions from the positive electrode plate, thereby further facilitating suppression of formation of lithium dendrites, and ensuring cycle performance and safety performance of the electrochemical energy storage apparatus. Herein, the thickness of the negative electrode active layer means thickness of the negative electrode active layer on a function surface of the negative electrode current collector, and the thickness of the positive electrode active layer means thickness of the positive electrode active layer on a function surface of the positive electrode current collector.

The electrochemical energy storage apparatus in the present disclosure further includes a separator located between the positive electrode plate and the negative electrode plate for separating the positive electrode plate and the negative electrode plate.

In some embodiments, the separator includes a substrate and a coating layer on at least one surface of the substrate, a thickness of the substrate ranges from 3 μm to 22 μm (for example, 3 μm, 5 μm, 8 μm, 10 μm, 12 μm, 15 μm, 18 μm, 20 μm), and a thickness of the coating layer ranges from 0 μm to 10 μm (for example, 0 μm, 1 μm, 2 μm, 5 μm, 6 μm, 8 μm, 10 μm; when the thickness of the coating layer is 0, the separator is an uncoated separator; when the thickness of the coating layer is not 0, the separator is a coated separator). The substrate may include at least one of a polyethylene (PE) film, a polypropylene (PP) film, and a composite film composed of the PP film and the PE film. The composite film is, for example, a composite film composed of the PP film, the PE film, and the PP film in sequence (PP/PE/PP composite film for short). The coating layer may include a glue coating layer on a surface of the substrate and a ceramic coating layer on a surface of the glue coating layer. A raw material of the glue coating layer may be a binder, a raw material of the ceramic coating may include ceramic particles and a binder, and the ceramic particles may include, but are not limited to, alumina.

The electrochemical energy storage apparatus in the present disclosure further includes an electrolyte, and a common electrolyte may be employed in the present disclosure. For example, the electrolyte may include a non-aqueous electrolyte, and a raw material of the non-aqueous electrolyte may include a non-aqueous solvent, a lithium salt, and an additive. The non-aqueous solvent includes at least one of ethylene carbonate, propylene carbonate, dimethyl carbonate, diethyl carbonate, ethyl methyl carbonate, ethyl acetate, ethyl propionate, propyl propionate, and propyl acetate. The lithium salt includes at least one of lithium hexafluorophosphate, lithium bis(fluorosulfonyl)imide, lithium difluoro oxalate borate, lithium bis(trifluoromethanesulfonyl)imide, and lithium bis(oxalate)borate. The additive includes at least one of ethylene sulphite, lithium bis(oxalate)borate, ethylene sulfate, tris(trimethylsilyl) borate, 1,3-propene sultone, 1,3-propane sultone, vinylethylene carbonate, ethylene sulfite ethylidene, lithium difluorophosphate, lithium difluorobisoxalate phosphate, lithium tetrafluoro(oxalato)phosphate, lithium borophosphate, and ethyl 3-methoxypropionate.

For example, the electrochemical energy storage apparatus in the present disclosure may be a lithium-ion battery. The lithium-ion battery of the present disclosure may be prepared according to a conventional method in the art. For example, a positive electrode plate, a separator, and a negative electrode plate may be stacked in sequence, and wound (or laminated) to form a battery cell, and then a battery is manufactured after processes such as packaging, baking of the battery cell, electrolyte filling (that is, injection of an electrolyte), hot pressing, and formation, and these steps/processes are all conventional operations in the art and will not be described again.

In addition, the lithium-ion battery in the present disclosure further includes a pre-lithiation layer. For example, the pre-lithiation layer may be provided on a surface, close to the separator, of the negative electrode plate. The composition of the pre-lithiation layer is consistent with that common in the art, and details are not described in the present disclosure.

A third aspect of the present disclosure provides an electronic apparatus, and the electronic apparatus includes the electrochemical energy storage apparatus in the second aspect. The electrochemical energy storage apparatus provides energy for driving the electronic apparatus. A specific type of the electronic apparatus is not limited in the present disclosure, and the electronic apparatus may be any electronic apparatus capable of operating based on a supply of electric power output by the electrochemical energy storage apparatus. For example, the electronic apparatus may be a mobile phone, an unmanned aerial vehicle, an electric vehicle, or the like.

The negative electrode plate and the lithium-ion battery according to the present disclosure will be described below in detail through specific examples.

Example 1-Example 4

The negative electrode plate in the examples includes a copper foil and a negative electrode active layer located on two function surfaces of the copper foil (with a thickness of 5 μm), and a negative electrode active material in the negative electrode active layer is a first amorphous carbon material.

Other related parameters of the negative electrode plate are shown in Table 1. In Example 1 and Example 4, a same first amorphous carbon material was used.

FIG. 1 is an SEM graph of the first amorphous carbon material in Example 1. It may be learned from FIG. 1 that the first amorphous carbon material exhibits a random structure.

Figure 2:
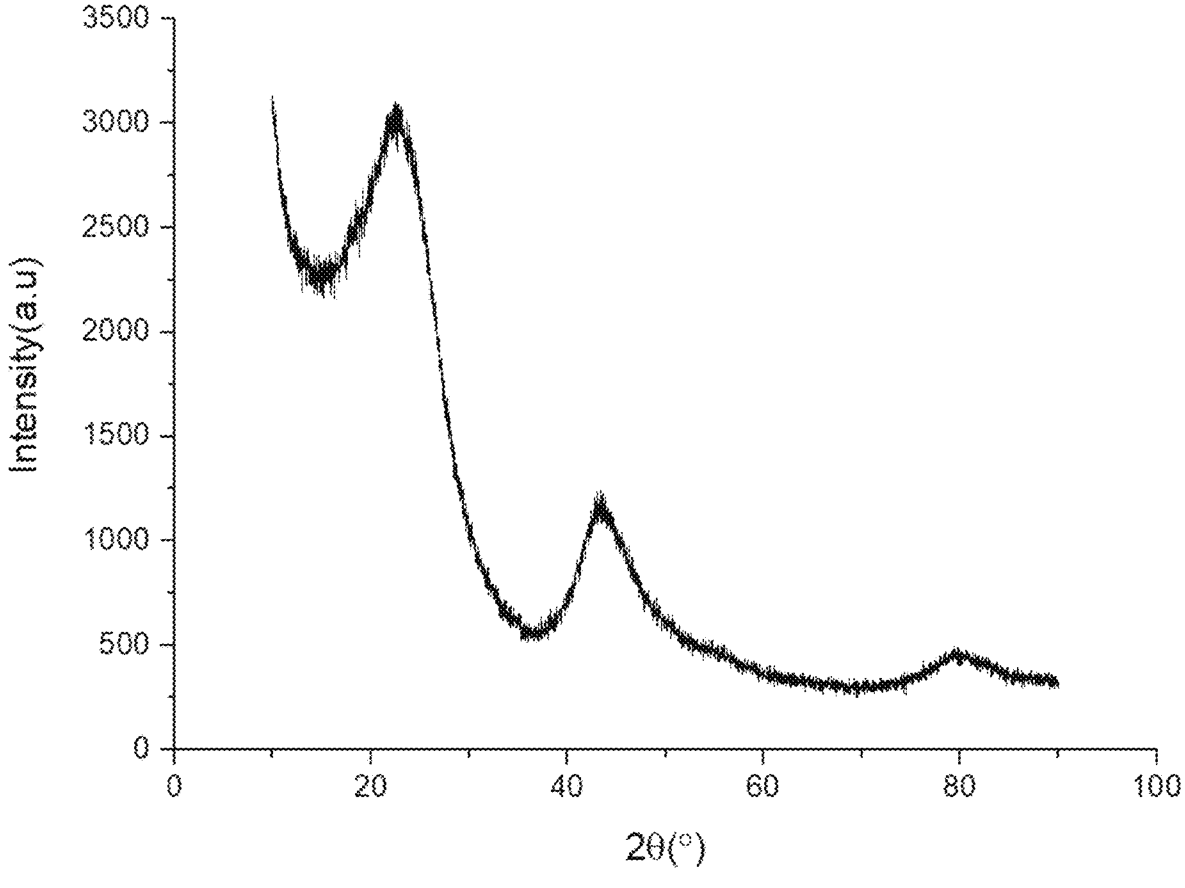
FIG. 2 is an XRD pattern of a first amorphous carbon material in Example 1.
Figure 3:
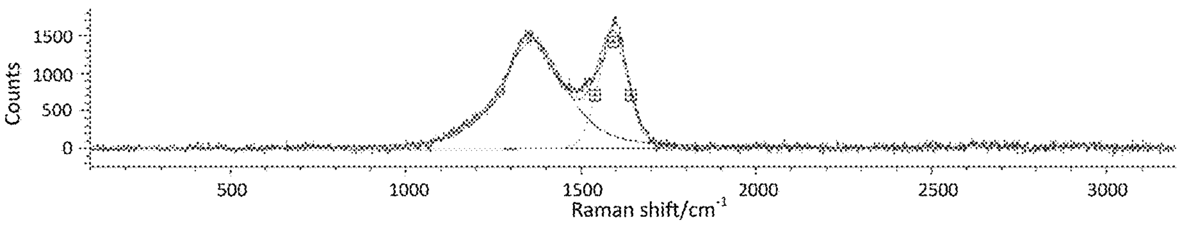
FIG. 3 is a Raman pattern of a first amorphous carbon material in Example 1.
Figure 4:
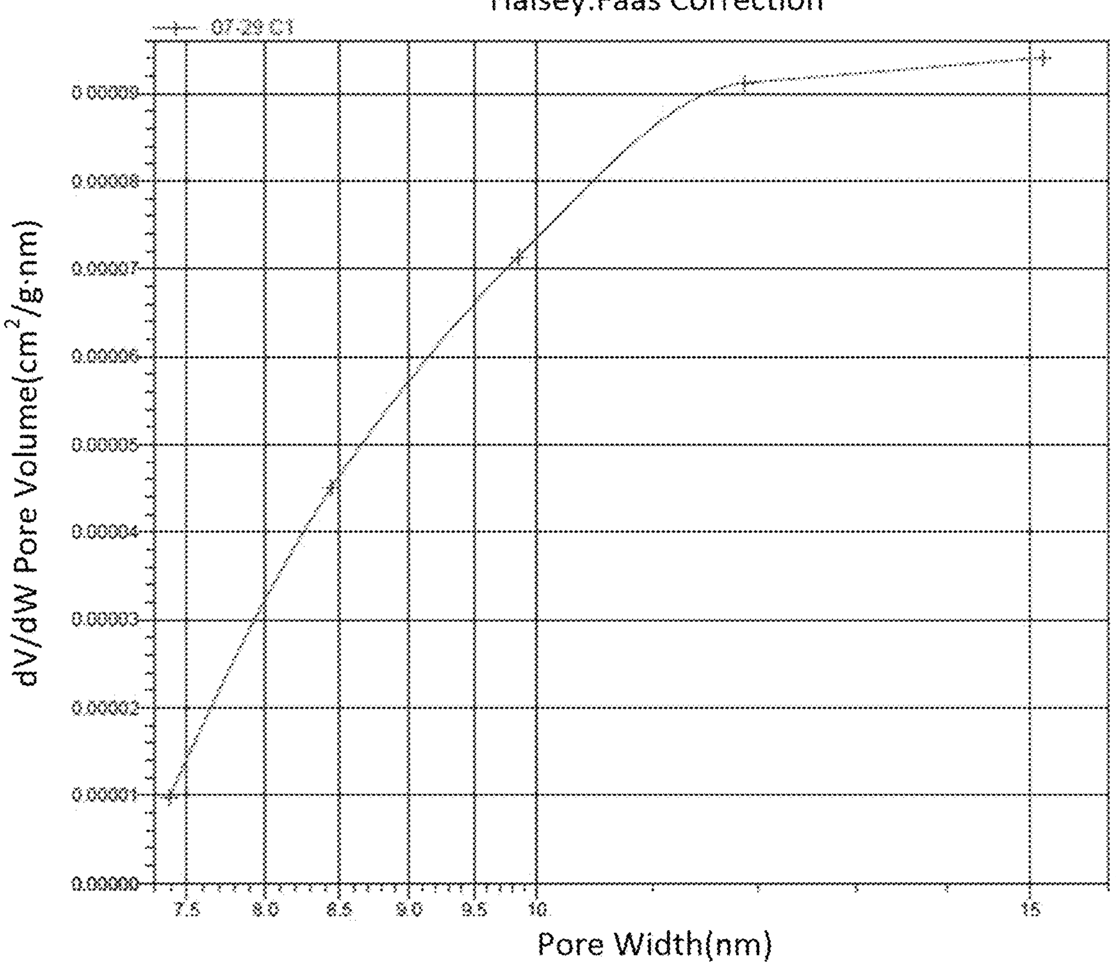
FIG. 4 is a BJH pore size distribution graph of a first amorphous carbon material in Example 1.

FIG. 2 is an XRD pattern of the first amorphous carbon material in Example 1, and the XRD detection was performed by using a Bruker D8 x-ray diffractometer. It may be learned from FIG. 2 that, 2θ of a diffraction peak of the first amorphous carbon material is 22.58 degrees, and an intensity of the diffraction peak is 3049, with a peak width at half height of 13.6. FIG. 3 is a Raman pattern of the first amorphous carbon material in Example 1, and the Raman detection was performed by using an InVia Reflex Raman spectrometer. It may be learned from FIG. 3 that, an Id/Ig peak ratio of the first amorphous carbon material is 1.09. FIG. 4 is a BJH pore size distribution graph of the first amorphous carbon material in Example 1. It may be learned from FIG. 4 that, an average particle size of pores of the first amorphous carbon material is 12.57 nm.

Figure 5:
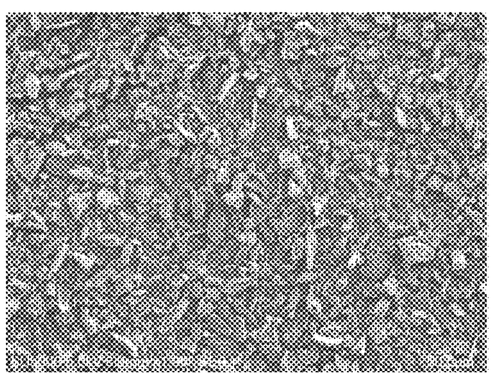
FIG. 5 is an SEM pattern of a first amorphous carbon material in Example 2.
Figure 6:
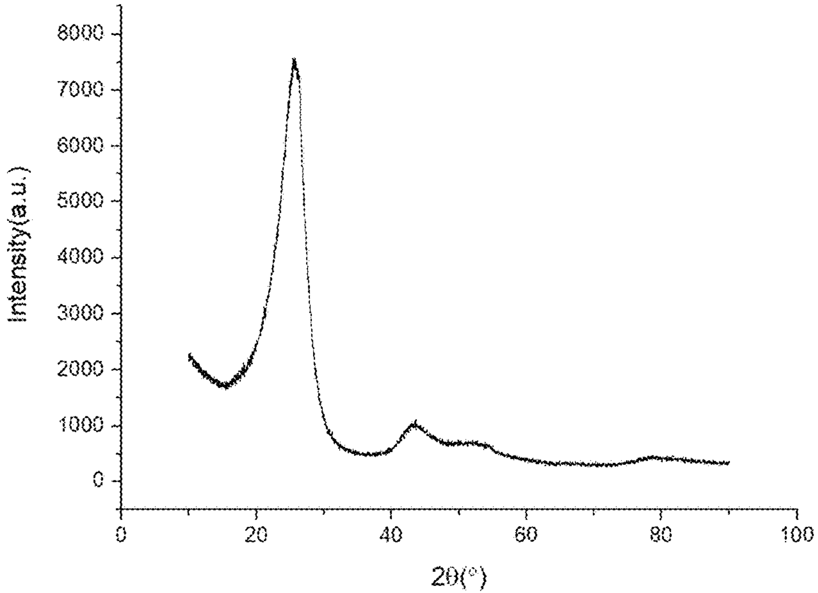
FIG. 6 is an XRD pattern of a first amorphous carbon material in Example 2.
Figure 7:
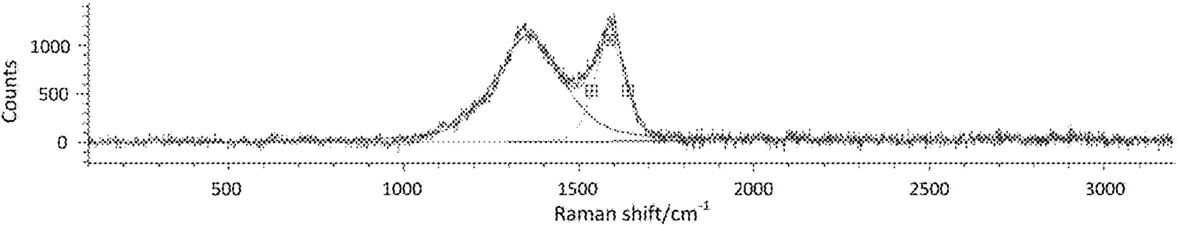
FIG. 7 is a Raman pattern of a first amorphous carbon material in Example 2.
Figure 8:
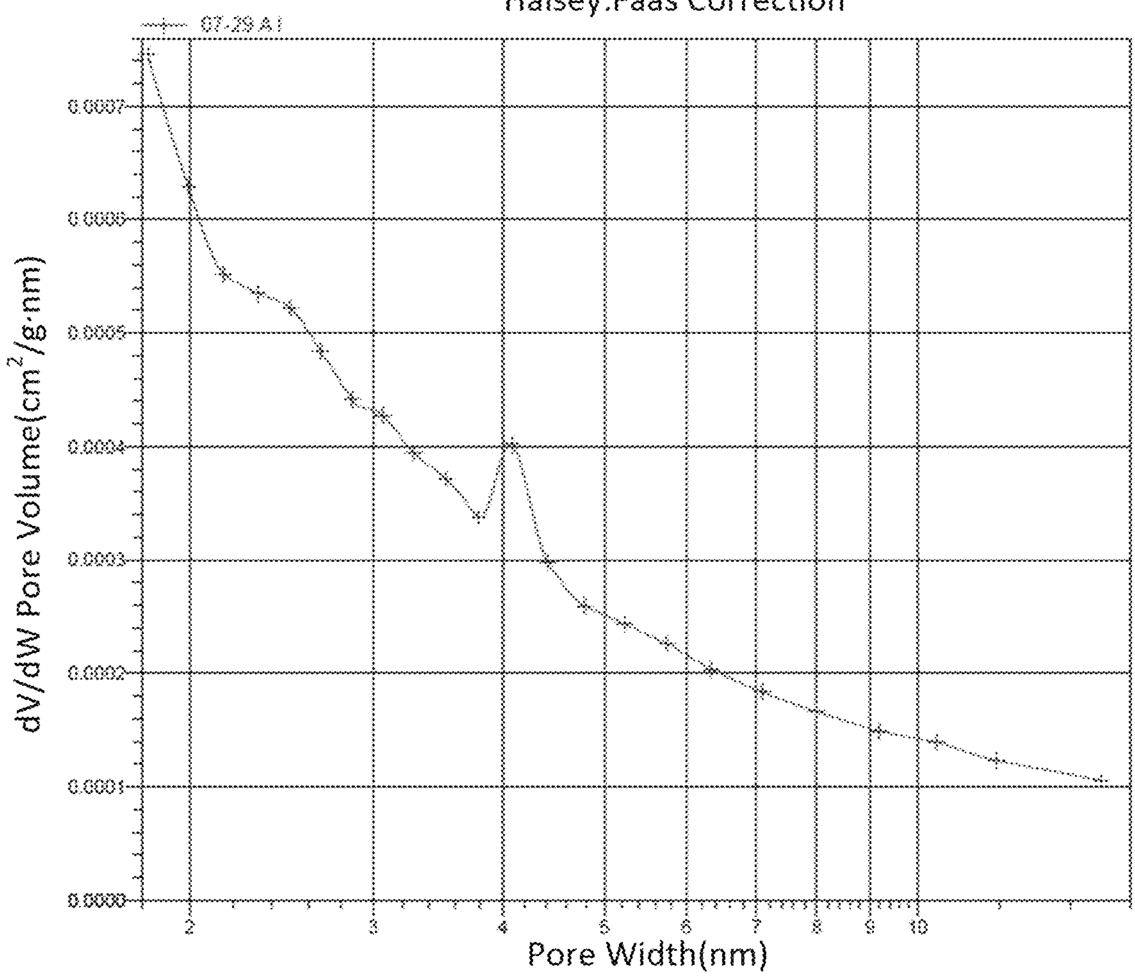
FIG. 8 is a BJH pore size distribution graph of a first amorphous carbon material in Example 2.

FIG. 5 is an SEM pattern of the first amorphous carbon material in Example 2. FIG. 6 is an XRD pattern of the first amorphous carbon material in Example 2, and the XRD detection was performed by using a Bruker $D_8$ x-ray diffractometer. It may be learned from FIG. 6 that, 2θ of a diffraction peak of the first amorphous carbon material is 25.47 degrees, and an intensity of the diffraction peak is 7567, with a peak width at half height of 5.33. FIG. 7 is a Raman pattern of the first amorphous carbon material in Example 2, and the Raman detection was performed by using an InVia Reflex Raman spectrometer. It may be learned from FIG. 7 that, an Id/Ig peak ratio of the first amorphous carbon material is 1.05. FIG. 8 is a BJH pore size distribution graph of the first amorphous carbon material in Example 2.

Figure 9:
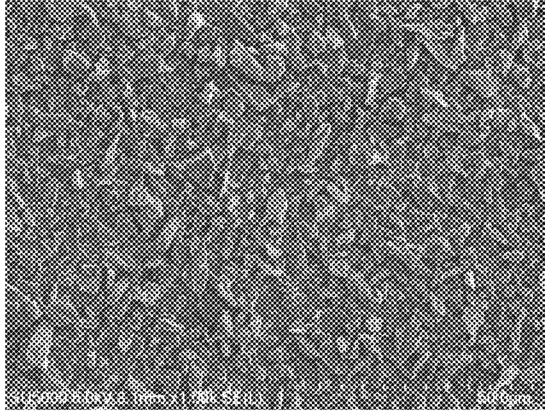
FIG. 9 is an SEM pattern of a first amorphous carbon material in Example 3.
Figure 10:
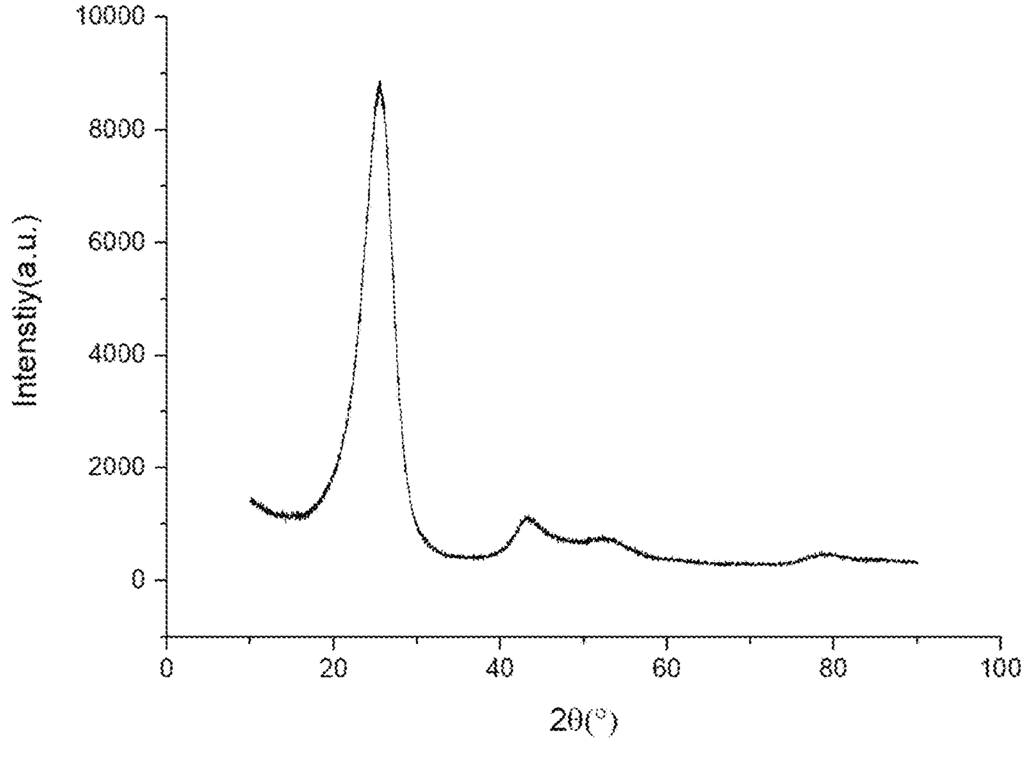
FIG. 10 is an XRD pattern of a first amorphous carbon material in Example 3.
Figure 11:
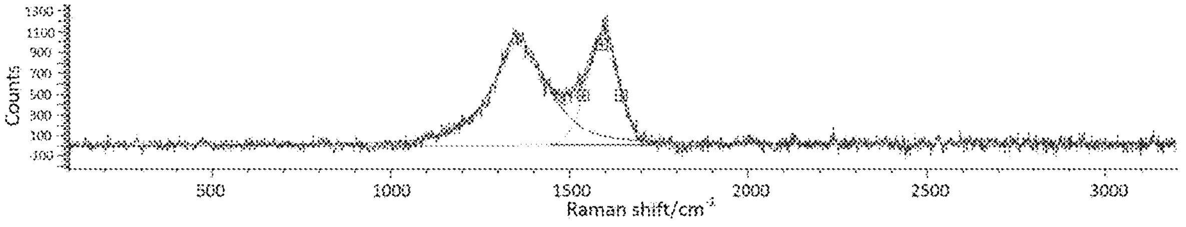
FIG. 11 is a Raman pattern of a first amorphous carbon material in Example 3.
Figure 12:
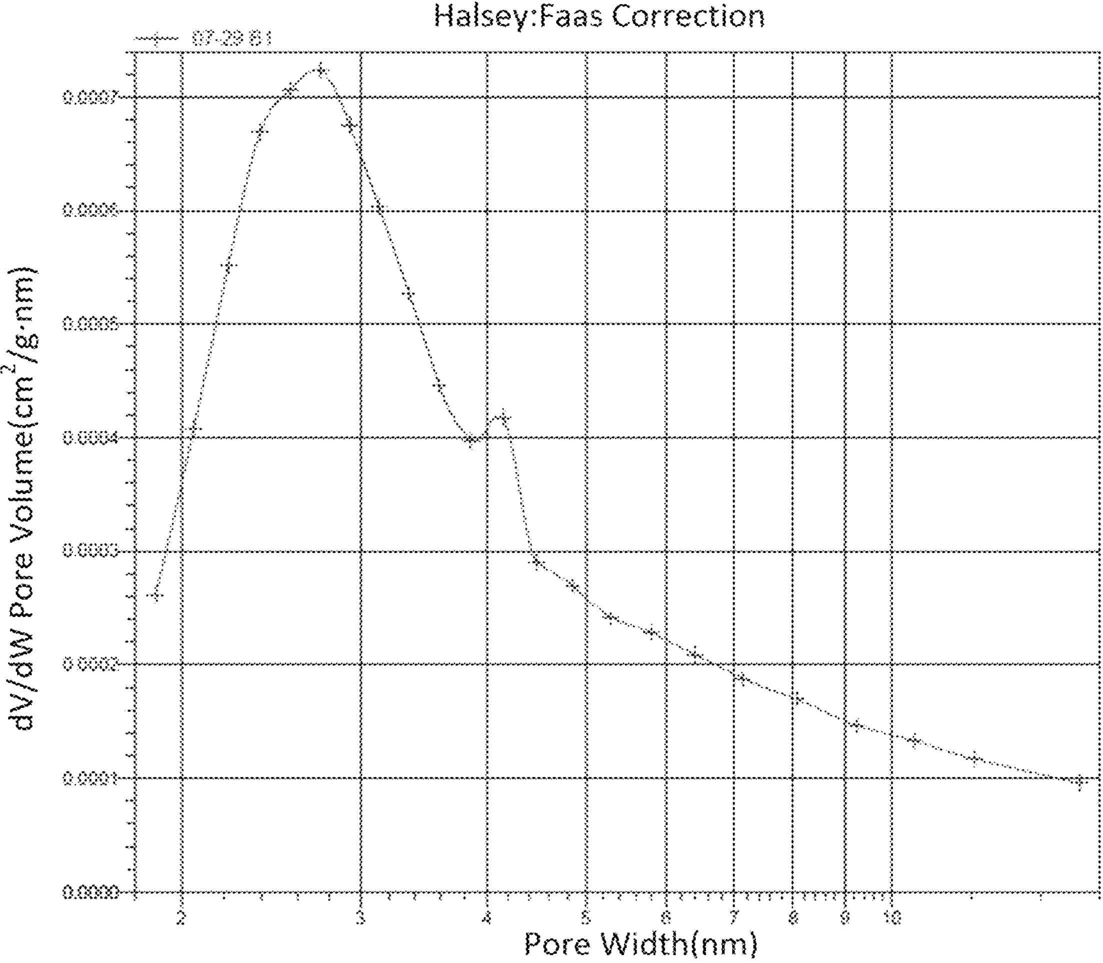
FIG. 12 is a BJH pore size distribution graph of a first amorphous carbon material in Example 3.

FIG. 9 is an SEM pattern of the first amorphous carbon material in Example 3. FIG. 10 is an XRD pattern of the first amorphous carbon material in Example 3, and the XRD detection was performed by using a Bruker D8 x-ray diffractometer. It may be learned from FIG. 10 that, 2θ of a diffraction peak of the first amorphous carbon material is 25.22 degrees, and an intensity of the diffraction peak is 8826, with a peak width at half height of 4.47. FIG. 11 is a Raman pattern of the first amorphous carbon material in Example 3, and the Raman detection was performed by using an InVia Reflex Raman spectrometer. It may be learned from FIG. 11 that, an Id/Ig peak ratio of the first amorphous carbon material is 1.04. FIG. 12 is a BJH pore size distribution graph of the first amorphous carbon material in Example 3.

Comparative Example 1

A negative electrode plate in this comparative example includes a copper foil and a negative electrode active layer located on two function surfaces of the copper foil (with a thickness of 5 μm), and a negative electrode active material in the negative electrode active layer is a low-capacity amorphous carbon material. Other related parameters of the negative electrode plate are shown in Table 1.

In Examples 1 to 4 and Comparative Example 1, the negative electrode active layer includes 97% negative electrode active material (a first amorphous carbon material or a low-capacity amorphous carbon material), 1.5% SBR, 0.5% superconducting carbon black, and 1% CMC according to mass percentage.

TABLE 1

| | Negative electrode active layer | | | | | |
|---|---|---|---|---|---|---|
| | Thickness | First amorphous carbon material | | | | |
| | of negative electrode active layer (μm) | Interlayer spacing d002 (nm) | Average pore diameter of pores | $d_1$ (μm) | BET ($m^2/g$) | Capacity per gram (mAh/g) |
| Example 1 | 69.6 | 0.383 | 12.57 | 8.4 | 3.9 | 560 |
| Example 2 | 75 | 0.349 | 4.4 | 4.3 | 2.9 | 520 |
| Example 3 | 79 | 0.345 | 4.9 | 5.3 | 2.3 | 480 |
| Example 4 | 87 | 0.383 | 12.57 | 8.4 | 3.9 | 560 |
| Comparative Example 1 | 125.1 | 0.338 | 1.8 | 7.3 | 1.25 | 286 |

Example 1a-Example 7a

The negative electrode plate in the foregoing examples includes a copper foil and a negative electrode active layer on two function surfaces of the copper foil (with a thickness of 5 μm), and a negative electrode active material in the negative electrode active layer is a first mixture of a first amorphous carbon material (with a mass of $M_1$) and a second amorphous carbon material (with a mass of $M_2$). Other related parameters of the negative electrode plate are shown in Table 1-a.

Negative electrode active layers of the negative electrode plates in Examples 1a-Example 5a have a same mass.

Comparative Example 1a

The negative electrode plate in this comparative example differs from those in the foregoing examples in that the first amorphous carbon material is replaced with a low-capacity amorphous carbon material. Other related parameters of the negative electrode plate are shown in Table 1-a.

TABLE 1-a

| Negative electrode plate | Negative electrode active layer | | | | | | | | |
|---|---|---|---|---|---|---|---|---|---|
| | | First amorphous carbon material | | | | | | Second amorphous carbon material | |
| | $M_2$/ ($M_2$+ $M_1$) (%) | Interlayer spacing d002 (nm) | Average pore diameter of pores (nm) | $d_1$ (μm) | BET ($m^2$/g) | Capacity per gram (mAh/g) | | $d_2$ (μm) | BET ($m^2$/g) |
| Example 1a | 2% | | Example 1 | | | | | 2.3 | 8.34 |
| Example 2a | 5% | | Example 1 | | | | | 2.3 | 8.34 |
| Example 3a | 10% | | Example 1 | | | | | 2.3 | 8.34 |
| Example 4a | 15% | | Example 1 | | | | | 2.3 | 8.34 |
| Example 5a | 30% | | Example 1 | | | | | 2.3 | 8.34 |
| Example 6a | 10% | | Example 2 | | | | | 2.3 | 8.34 |
| Example 7a | 10% | | Example 3 | | | | | 2.3 | 8.34 |
| Comparative Example 1a | 10% | | Comparative Example 1 | | | | | 2.3 | 8.34 |

Example 1b-Example 10b

The negative electrode plate in the examples includes a copper foil and a negative electrode active layer located on two function surfaces of the copper foil (with a thickness of 5 μm), and the negative electrode active layer includes a first amorphous carbon layer and a second amorphous carbon layer that are sequentially away from the current collector. A negative electrode active material in the first amorphous carbon layer is a first amorphous carbon material, and a negative electrode active material in the second amorphous carbon layer is a second amorphous carbon material.

Other related parameters of the negative electrode plate are shown in Table 1-b.

Examples 8b and 9b are substantially identical to Example 1b except that the second amorphous carbon material is replaced.

Comparative Example 1b

A negative electrode active layer of the negative electrode plate in the comparative example is only a first amorphous carbon layer. Other related parameters of the negative electrode plate are shown in Table 1-b.

Comparative Example 2b

A negative electrode plate in this comparative example is substantially identical to that in Example 1b, and a difference lies in that the first amorphous carbon material in Example 1b is replaced with a low-capacity amorphous carbon material. Other related parameters of the negative electrode plate are shown in Table 1-b.

In Example 1b-Example 10b and Comparative Examples, the first amorphous carbon layer includes 97% negative electrode active material (a first amorphous carbon material), 1.5% SBR, 0.5% superconducting carbon black, and 1% CMC according to mass percentage. The second amorphous carbon material includes 97% negative electrode active material (a second amorphous carbon material), 0.5% superconducting carbon black, 1.5% SBR, and 1% CMC according to mass percentage. A compacted density of the negative electrode plate in each example is 1 g/$cm^3$.

TABLE 1-b

| | First amorphous carbon | | Second amorphous carbon layer | | | |
|---|---|---|---|---|---|---|
| | | | | Second amorphous carbon material | | |
| | Thickness $H_1$ (μm) | First amorphous carbon material Source | Thickness $H_2$ (μm) | $d_2$ (μm) | BET ($m^2$/g) | $D_2$ (μm) |
| Example 1b | 63.07 | Example 1 | 11.13 | 2.3 | 8.34 | 9.5 |
| Example 2b | 60.64 | Example 1 | 15.16 | 2.3 | 8.34 | 9.5 |
| Example 3b | 55.58 | Example 1 | 23.82 | 2.3 | 8.34 | 9.5 |
| Example 4b | 65.43 | Example 1 | 7.07 | 2.3 | 8.34 | 9.5 |
| Example 5b | 52.73 | Example 1 | 24.17 | 2.3 | 8.34 | 9.5 |
| Example 6b | 65.45 | Example 2 | 11.55 | 2.3 | 8.34 | 9.5 |
| Example 7b | 67.75 | Example 3 | 11.95 | 2.3 | 8.34 | 9.5 |
| Example 8b | 63.07 | Example 1 | 11.13 | 1.5 | 8.34 | 9.5 |
| Example 9b | 63.07 | Example 1 | 11.13 | 3 | 9.2 | 4.3 |
| Example 10b | 43.26 | Example 1 | 18.54 | 2.3 | 8.34 | 9.5 |
| Comparative Example 1b | 69.6 | Example 1 | \ | \ | | |
| Comparative Example 2b | 102.94 | Comparative Example 1 | 18.16 | 2.3 | 8.34 | 9.5 |

Examples 1c-Example 13c, and Example 15c-Example 18c

The negative electrode plate in the examples includes a copper foil and a negative electrode active layer on two function surfaces of the copper foil (with a thickness of 5 μm), a negative electrode active material in the negative electrode active layer is a second mixture of a graphite material (graphite is a core-shell structured graphite material of a core) and a first amorphous carbon material, and a mass percentage of the first amorphous carbon material in the mixture is W.

Other related parameters of the negative electrode plate are shown in Table 1-c. Negative electrode active layers of the negative electrode plates in Example 1c-Example 9c have a same mass. Example 12c is substantially the same as Example 5c except that the graphite material is replaced. Example 13c is substantially the same as Example 10c except that the graphite material is replaced.

Example 14c

Example 14c is substantially the same as Example 5c, except that the core-shell graphite material is replaced with ordinary pure graphite particles. Other related parameters of the negative electrode plate are shown in Table 1-c.

Comparative Example 1c

A negative electrode active material of the negative electrode active layer in this comparative example is only a graphite material. Other related parameters of the negative electrode plate are shown in Table 1-c.

Comparative Example 2c

A negative electrode plate in this comparative example is substantially identical to that in Example 5c, and a difference lies in that the amorphous carbon material in Example 5c is replaced with a low-capacity amorphous carbon material. Other related parameters of the negative electrode plate are shown in Table 1-c.

In Examples 1c-18c and Comparative Examples, the negative electrode active layer includes 97% negative electrode active material, 1.5% SBR, 0.5% superconducting carbon black, and 1% CMC according to mass percentage.

TABLE 1-c

| | Negative electrode active layer | | | |
|---|---|---|---|---|
| | Thickness (μm) | W (%) | First amorphous carbon material Source | Graphite material $d_3$ (μm) |
| Example 1c | 69.4 | 90 | Example 1 | 12.7 |
| Example 2c | 68.8 | 80 | Example 1 | 12.7 |
| Example 3c | 67.3 | 70 | Example 1 | 12.7 |
| Example 4c | 67.8 | 60 | Example 1 | 12.7 |
| Example 5c | 66.9 | 50 | Example 1 | 12.7 |
| Example 6c | 68.1 | 40 | Example 1 | 12.7 |
| Example 7c | 63.7 | 30 | Example 1 | 12.7 |
| Example 8c | 64.3 | 20 | Example 1 | 12.7 |
| Example 9c | 64.8 | 10 | Example 1 | 12.7 |
| Example 10c | 69.6 | 50 | Example 2 | 12.7 |
| Example 11c | 73.8 | 50 | Example 3 | 12.7 |
| Example 12c | 66.9 | 50 | Example 1 | 7.2 |
| Example 13c | 69.6 | 50 | Example 2 | 38.0 |
| Example 14c | 66.9 | 50 | Example 1 | 11.1 |
| Example 15c | 77.8 | 50 | Example 1 | 12.7 |
| Example 16c | 66.9 | 50 | Example 1 | 12.7 |
| Example 17c | 189.7 | 50 | Example 1 | 12.7 |
| Example 18c | 39.7 | 50 | Example 1 | 12.7 |
| Comparative Example 1c | 62.6 | 0 | / | 12.7 |
| Comparative Example 2c | 66.9 | 50 | Comparative Example 1 | 12.7 |

Example 1d-Example 11d, Example 14d, and Example 15d

The negative electrode plate in the examples includes a copper foil and a negative electrode active layer located on two function surfaces of the copper foil (with a thickness of 5 μm), and the negative electrode active layer includes a graphite layer and a first amorphous carbon layer that are sequentially away from the current collector. A negative electrode active material in the graphite layer is a core-shell structured graphite material with graphite as a core and the first amorphous carbon material as a shell. A negative electrode active material in the first amorphous carbon layer is the first amorphous carbon material. Other related parameters of the negative electrode plate are shown in Table 1-d.

Example 12d

The negative electrode plate in the example includes a copper foil and a negative electrode active layer located on two function surfaces of the copper foil (with a thickness of 5 μm), and the negative electrode active layer includes a graphite layer and a first amorphous carbon layer that are sequentially away from the current collector. A negative electrode active material in the graphite layer is common graphite particles. A negative electrode active material in the first amorphous carbon layer is the first amorphous carbon material. Other related parameters of the negative electrode plate are shown in Table 1-d.

Example 13d

A negative electrode plate in this example is substantially identical to that in Example 4d, and a difference lies in that a negative electrode active layer in this example includes a first amorphous carbon layer and a graphite layer that are sequentially away from the current collector. Other related parameters of the negative electrode plate are shown in Table 1-d.

Comparative Example 1d

A negative electrode active layer in this comparative example only includes a graphite layer. Other related parameters of the negative electrode plate are shown in Table 1-d.

Comparative Example 2d

A negative electrode plate in this comparative example is substantially identical to that in Example 1d, and a difference lies in that the first amorphous carbon material (including a shell in a core-shell structured graphite material and a first amorphous carbon material in the first amorphous carbon layer) in Example 1b is replaced with a low-capacity amorphous carbon material. Other related parameters of the negative electrode plate are shown in Table 1-d.

In Example 1d-Example 15d and Comparative Examples, the first amorphous carbon layer includes 97% first amorphous carbon material, 1.5% SBR, 0.5% superconducting carbon black, and 1% CMC according to mass percentage. The graphite layer includes 97% graphite material, 0.5% conductive agent, 1.5 binder, and 1% CMC by mass percentage.

TABLE 1-d

| | Negative electrode active layer | | | | | | |
|---|---|---|---|---|---|---|---|
| | First amorphous carbon layer | | | Graphite layer | | | |
| | Thickness | Amorphous carbon material | | | Graphite material | | Compacted |
| | $H_1$ (μm) | Source | $D_1$ (μm) | Thickness $H_3$ (μm) | $d_3$ (μm) | $D_3$ (μm) | density (g/cm$^3$) |
| Example 1d | 13.38 | Example 1 | 12 | 53.52 | 12.7 | 32 | 1.45 |
| Example 2d | 20.07 | Example 1 | 12 | 46.83 | 12.7 | 32 | 1.35 |
| Example 3d | 26.76 | Example 1 | 12 | 40.14 | 12.7 | 32 | 1.30 |
| Example 4d | 33.45 | Example 1 | 12 | 33.45 | 12.7 | 32 | 1.25 |
| Example 5d | 40.14 | Example 1 | 12 | 26.76 | 12.7 | 32 | 1.21 |
| Example 6d | 6.69 | Example 1 | 12 | 60.21 | 12.7 | 32 | 1.54 |
| Example 7d | 56 | Example 1 | 12 | 10.9 | 12.7 | 32 | 1.06 |
| Example 8d | 36.2 | Example 1 | 12 | 36.2 | 12.7 | 32 | 1.23 |
| Example 9d | 43.98 | Example 1 | 12 | 29.32 | 12.7 | 32 | 1.26 |
| Example 10d | 34.4 | Example 2 | 14 | 34.4 | 12.7 | 32 | 1.3 |
| Example 11d | 34.7 | Example 3 | 16.1 | 34.7 | 12.7 | 32 | 1.35 |
| Example 12d | 33.45 | Example 1 | 12 | 33.45 | 11.1 | 28 | 1.25 |
| Example 13d | 33.45 | Example 1 | 12 | 33.45 | 12.7 | 32 | 1.25 |
| Example 14d | 38.9 | Example 1 | 12 | 38.9 | 12.7 | 32 | 1.28 |
| Example 15d | 29.9 | Example 1 | 12 | 29.9 | 12.7 | 32 | 1.1 |
| Comparative Example 1 | \ | \ | \ | 66.9 | 12.7 | 32 | 1.75 |
| Comparative Example 2 | 44.7 | Comparative Example 1 | 17.8 | 44.7 | 12.7 | 32 | 1.35 |

Example 1e-Example 10e, Example 14e, and Example 15e

The negative electrode plate in Example 1e-Example 10e, Example 14e, and Example 15e includes a copper foil and a negative electrode active layer located on two function surfaces of the copper foil (with a thickness of 5 μm), and a negative electrode active material in the negative electrode active layer is a third mixture of a silicon-based material (with a mass of $M_4$) and a first amorphous carbon material (with a mass of $M_1$). Mixtures in Example 1e-Example 10e have a same mass. Other related parameters of the negative electrode plate are shown in Table 1-1e.

Example 11e-Example 13e

The negative electrode plate in the examples includes a copper foil and a negative electrode active layer located on two function surfaces of the copper foil (with a thickness of 6 μm), and the negative electrode active layer includes a silicon-based active layer (with a thickness of $H_4$) and a first amorphous carbon layer (with a thickness of $H_1$) that are sequentially away from the current collector. A negative electrode active material in the first amorphous carbon layer is a first amorphous carbon material, and a negative electrode active material in the silicon-based active layer is a silicon-based material. Other related parameters of the negative electrode plate are shown in Table 1-2e.

Comparative Example 1e

A negative electrode plate in this comparative example is substantially identical to that in Example 1e, and a difference lies in that the amorphous carbon material in Example 1e is replaced with a low-capacity amorphous carbon material. Other related parameters of the negative electrode plate are shown in Table 1-1e.

In Examples 1e-10e, Example 14e, Example 15e, and Comparative Examples, the negative electrode active layer includes 97% negative electrode active material, 1.5% SBR, 0.5% superconducting carbon black, and 1% CMC according to mass percentage.

In Example 11e-Example 13e, the first amorphous carbon layer includes 97% negative electrode active material, 1.5% SBR, 0.5% superconducting carbon black, and 1% CMC according to mass percentage. The silicon-based active layer includes 97% silicon-based material, 0.5% conductive carbon black, 1.5% SBR binder, and 1% CMC according to mass percentage.

TABLE 1-1e

| | Negative electrode active layer (mixture of a first amorphous carbon material and a silicon-based material) | | | | | |
|---|---|---|---|---|---|---|
| | | First amorphous | Silicon-based material | | | |
| | Thickness (μm) | carbon material Source | $d_4$ (μm) | $D_4$ (μm) | Component | $M_2/(M_2 + M_4)$(%) |
| Example 1e | 68.5 | Example 1 | 8.9 | 22 | SiO | 1 |
| Example 2e | 66.3 | Example 1 | 8.9 | 22 | SiO | 3 |
| Example 3e | 63.2 | Example 1 | 8.9 | 22 | SiO | 6 |
| Example 4e | 57.9 | Example 1 | 8.9 | 22 | SiO | 12 |
| Example 5e | 50.2 | Example 1 | 8.9 | 22 | SiO | 23 |

TABLE 1-1e-continued

| | Negative electrode active layer (mixture of a first amorphous carbon material and a silicon-based material) | | | | | |
|---|---|---|---|---|---|---|
| | | First amorphous | Silicon-based material | | | |
| | Thickness (μm) | carbon material Source | $d_4$ (μm) | $D_4$ (μm) | Component | $M_2/(M_2 + M_4)$(%) |
| Example 6e | 69.5 | Example 1 | 8.9 | 22 | SiO | 0.1 |
| Example 7e | 66.3 | Example 1 | 12 | 31.2 | SiO | 3 |
| Example 8e | 68.7 | Example 1 | 7.9 | 20 | SiC | 3 |
| Example 9e | 71 | Example 2 | 8.9 | 22 | SiO | 3 |
| Example 10e | 79.6 | Example 3 | 8.9 | 22 | SiO | 3 |
| Example 14e | 95.4 | Example 3 | 8.9 | 22 | SiO | 3 |
| Example 15e | 38.6 | Example 1 | 8.9 | 22 | SiO | 3 |
| Comparative Example 1e | 129.3 | Comparative Example 1 | 8.9 | 22 | SiO | 3 |

TABLE 1-2e

| | Negative electrode active layer (first amorphous carbon layer and silicon-based active layer that are stacked) | | | | | | |
|---|---|---|---|---|---|---|---|
| | | first amorphous carbon layer | | Silicon-based active layer | | | |
| | Thickness | First amorphous carbon material | Thickness $H_1$ | Silicon-based material | | | Thickness $H_4$ |
| | (μm) | Source | (μm) | $d_4$ | $D_4$ | Component | (μm) |
| Example 11e | 64.3 | Example 1 | 62.3 | 8.9 | 22 | SiO | 2 |
| Example | 63.2 | Example 1 | 79.4 | 8.9 | 22 | SiO | 3.8 |
| Example | 38.65 | Example 1 | 27.10 | 8.9 | 22 | SiO | 11.55 |

Specific detection methods for each parameter in the foregoing tables are as follows.

1. Interlayer Spacing

Tested with XRD by using a Brooke D8 x-ray diffractometer, and calculated by using the Bragg equation $2d \sin \theta = n\lambda$.

2. Average Pore Diameter of Pores

Tested by using the BET $N_2$ gas adsorption method.

3. Average Particle Sizes $d_1$, $d_2$, $d_3$, and $d_4$ measured by using an FIB-SEM system.

4. Specific Surface Area BET

Tested by using TriStar 3020, Micromeritics, USA.

5. Thicknesses $H_1$, $H_2$, $H_3$, and $H_4$

Active layer thicknesses of electrode plates are measured by using a spiral micrometer.

6. Maximum Particle Sizes $D_1$, $D_2$, $D_3$, and $D_4$ measured by using a laser particle size analyzer.

7. Capacity Per Gram measured by using a button battery.

Test Example 1

The negative electrode plate in each of Examples 1-4 and Comparative Example 1, a positive electrode plate, and a separator were stacked in sequence, then wound to form a battery cell, and then lithium-ion batteries 1 to 6 were obtained after processes such as packaging, baking of the battery cell, electrolyte filling, hot pressing, and formation. The positive electrode plate includes an aluminum foil and a positive electrode active layer located on two function surfaces of the aluminum foil (with a thickness of 9 μm), and the positive electrode active layer includes 98.4% lithium cobalt oxide, 0.5% PVDF, and 1.1% Super-P according to mass percentage. Related parameters of the lithium-ion batteries are shown in Table 2.

The following parameters of the lithium-ion batteries 1 to 6 were measured, and the results are shown in Table 2. The detection methods are as follows.

1. −20° C. Discharge Capacity Retention Rate

A lithium-ion battery is left at −20° C., and is charged and discharged in a cyclic manner by using a current of 0.7 C in a charging and discharging voltage range of 4.48-3V; an initial capacity is recorded as Q, and a capacity after 50 cycles is $Q_2$; and a capacity retention rate of the battery circulating at a low temperature is calculated from the following formula:

$$\text{Capacity retention rate (\%)} = Q_2/Q \times 100$$

2. Volumetric Energy Density

Volumetric energy density=initial capacity/battery cell volume (if the battery cell is a cuboid, the battery cell volume is length*width*height)

A capacity discharged when a battery cell is discharged to 3V at a current of 0.2 C after the battery cell is charged to a cell upper limit voltage (4.48V) at a constant current of 0.5 C and a constant voltage at room temperature is the initial capacity.

3. Cell Expansion Rate

An initial thickness of a battery cell is measured by using PPG, and a cell thickness after 50 T cycles is measured by using PPG after 50 T cycles of charging at 1.2 C and discharging at 0.5 C at 25° C.

Cell expansion rate=(cell thickness after 50 T cycles−cell thickness before cycle)/cell thickness before cycle

TABLE 2

| | Negative electrode plate | | Positive electrode plate | | | |
|---|---|---|---|---|---|---|
| Lithium-ion battery | Source | Thickness of negative electrode active layer (μm) | Thickness of positive electrode active layer (μm) | −20° C. discharge capacity retention rate (%) | Volumetric energy density (Wh/L) | Cell expansion rate (%) |
| 1 | Example 1 | 69.6 | 50 | 72.26 | 812.48 | 1.01 |
| 2 | Example 2 | 75 | 50 | 72.12 | 783.18 | 1.03 |
| 3 | Example 3 | 79 | 50 | 71.32 | 762.3 | 1.04 |
| 4 | Example 4 | 87 | 50 | 71.01 | 724.19 | 1.02 |
| 5 | Example 1 | 69.6 | 77.2 | 71.17 | 680.47 | 1.0 |
| 6 | Comparative Example 1 | 125.1 | 50 | 70.63 | 584.99 | 1.0 |

Test Example 1a

Lithium-ion batteries 1a-8a were obtained after the negative electrode plates in foregoing Examples 1a-7a and Comparative Example 1a are assembled respectively according to the method in Test Example 1. The −20° C. discharge capacity retention rate, the volumetric energy density, and the cell expansion rate of the lithium-ion batteries 1a-8a were measured according to the foregoing methods, and the results are shown in Table 2-a.

TABLE 2-a

| | Negative electrode plate | | Positive electrode plate | | | |
|---|---|---|---|---|---|---|
| Lithium-ion battery | Source | Thickness of negative electrode active layer (μm) | Thickness of positive electrode active layer (μm) | −20° C. discharge capacity retention rate (%) | Volumetric energy density (Wh/L) | Cell expansion rate (%) |
| 1a | Example 1a | 70.2 | 50 | 72.84 | 809.29 | 1.03 |
| 2a | Example 2a | 71.1 | 50 | 72.95 | 804.33 | 1.03 |
| 3a | Example 3a | 72.6 | 50 | 73.11 | 795.93 | 1.02 |
| 4a | Example 4a | 74.2 | 50 | 74.42 | 787.35 | 1.01 |
| 5a | Example 5a | 79.4 | 50 | 76.21 | 760.45 | 0.98 |
| 6a | Example 6a | 77.8 | 50 | 72.96 | 768.43 | 1.02 |
| 7a | Example 7a | 83.8 | 50 | 72.98 | 738.95 | 1.03 |
| 8a | Comparative Example 1a | 134.2 | 50 | 70.11 | 559.36 | 1.04 |

Test Example 1b

Lithium-ion batteries 1b-14b were obtained after the negative electrode plates in foregoing Examples 1b-10b and Comparative Examples 1b and 2b are assembled respectively according to the method in Test Example 1. Related parameters of the lithium-ion batteries are shown in Table 2-b.

The following parameters of the lithium-ion batteries 1b-14b were measured, and the results are shown in Table 2-b. The detection methods are the same as those mentioned above.

TABLE 2-b

| | Negative electrode plate | | Positive electrode plate | −20° C. | | |
|---|---|---|---|---|---|---|
| Lithium-ion battery | Source | Thickness of negative electrode active layer (μm) | Thickness of positive electrode active layer (μm) | discharge capacity retention rate ( % ) | Volumetric energy density (Wh/L) | Cell expansion rate (%) |
| 1b | Example 1b | 74.2 | 50 | 76.15 | 808.11 | 1.03 |
| 2b | Example 2b | 75.8 | 50 | 76.98 | 799.78 | 0.98 |
| 3b | Example 3b | 79.4 | 50 | 78.18 | 791.2 | 0.96 |
| 4b | Example 4b | 72.5 | 50 | 74.04 | 809.37 | 1.02 |
| 5b | Example 5b | 76.9 | 50 | 78.93 | 787.07 | 1.04 |
| 6b | Example 6b | 77 | 50 | 75.08 | 776.36 | 1.02 |
| 7b | Example 7b | 79.7 | 50 | 75.05 | 762.91 | 1.01 |
| 8b | Example 8b | 74.2 | 50 | 77.20 | 791.2 | 1.03 |
| 9b | Example 9b | 74.2 | 50 | 75.04 | 791.2 | 1.03 |
| 10b | Example 3b | 79.4 | 45.1 | 74.68 | 770.37 | 1.01 |
| 11b | Example 10b | 61.8 | 67.0 | 75.64 | 771.1 | 1.03 |
| 12b | Example 10b | 61.8 | 50 | 75.81 | 784.2 | 1.02 |
| 13b | Comparative Example 1b | 69.6 | 50 | 72.26 | 812.48 | 1.01 |
| 14b | Comparative Example 2b | 121.1 | 50 | 72.13 | 597.06 | 1.03 |

It may be learned from Table 2-b that:

1. Compared with Comparative Example 1b and Comparative Example 2b, the negative electrode plate in the examples of the present disclosure can not only help improve low-temperature cycle performance of the lithium-ion battery, but also improve the volumetric energy density of the lithium-ion battery and effectively suppress expansion of the lithium-ion battery during cycling.

Comparative Example 2b is used as an example. When the negative electrode plate does not contain the first amorphous carbon material in the present disclosure, even if the negative electrode activity has higher thickness (that is, more negative electrode active materials are contained), the volumetric energy density of the lithium-ion battery cannot meet the requirements of the volumetric energy density of the lithium-ion battery in the present disclosure;

2. Compared with Example 4b and Example 5b, when the thickness $H_1$ of the first amorphous carbon layer and the thickness $H_2$ of the second amorphous carbon layer satisfy a specific relationship, the lithium-ion battery has both good low-temperature cycle performance and good volumetric energy density.

Test Example 1c

Lithium-ion batteries 1c-21c were obtained after the negative electrode plates in foregoing Examples 1c-18c and Comparative Examples 1c and 2c are assembled respectively according to the method in Test Example 1. Parameters of the lithium-ion batteries are shown in Table 2-c.

The volumetric energy density, cell expansion rate, and unit thickness capacity of the lithium-ion batteries 1c-21c were measured according to the foregoing methods. The unit thickness capacity was calculated as initial capacity of the lithium-ion battery/thickness of the negative electrode active layer. The results are shown in Table 2-c.

TABLE 2-c

| | Negative electrode plate | | | | | Positive electrode plate | | |
|---|---|---|---|---|---|---|---|---|
| Lithium-ion battery | Source | Thickness of negative electrode active layer (μm) | Compacted density (mg/cm²) | Surface density (mg/cm²) | Unit thickness capacity (mAh/μm) | Positive electrode active layer thickness (μm) | Volumetric energy density (Wh/L) | Cell expansion rate (%) |
| 1c | Example 1c | 69.4 | 1.02 | 7.29 | 72.04 | 50 | 802.05 | 1.2 |
| 2c | Example 2c | 68.8 | 1.1 | 7.57 | 72.88 | 50 | 817.07 | 1.38 |

TABLE 2-c-continued

| | Negative electrode plate | | | | | Positive electrode plate | | |
|---|---|---|---|---|---|---|---|---|
| Lithium-ion battery | Source | Thickness of negative electrode active layer (μm) | Compacted density (mg/cm$^2$) | Surface density (mg/cm$^2$) | Unit thickness capacity (mAh/μm) | Positive electrode active layer thickness (μm) | Volumetric energy density (Wh/L) | Cell expansion rate (%) |
| 3c | Example 3c | 67.3 | 1.17 | 7.87 | 74.29 | 50 | 820.59 | 1.7 |
| 4c | Example 4c | 67.8 | 1.21 | 8.2 | 73.74 | 50 | 823.06 | 2.75 |
| 5c | Example 5c | 66.9 | 1.28 | 8.56 | 74.73 | 50 | 828.47 | 3.47 |
| 6c | Example 6c | 68.1 | 1.34 | 9.12 | 73.4 | 50 | 821.4 | 3.41 |
| 7c | Example 7c | 63.7 | 1.5 | 9.55 | 78.49 | 50 | 810.27 | 4.05 |
| 8c | Example 8c | 64.3 | 1.57 | 10.03 | 77.76 | 50 | 806.49 | 5.23 |
| 9c | Example 9c | 64.8 | 1.63 | 10.56 | 77.16 | 50 | 803.56 | 5.28 |
| 10c | Example 10c | 69.6 | 1.33 | 9.15 | 71.83 | 50 | 812.31 | 3.67 |
| 11c | Example 11c | 73.8 | 1.24 | 9.15 | 67.75 | 50 | 789.01 | 3.25 |
| 12c | Example 12c | 66.9 | 1.28 | 8.56 | 74.73 | 50 | 828.47 | 5.44 |
| 13c | Example 13c | 69.6 | 1.33 | 9.15 | 71.83 | 50 | 812.31 | 4.23 |
| 14c | Example 14c | 66.9 | 1.28 | 8.56 | 74.73 | 50 | 828.47 | 3.47 |
| 15c | Example 15c | 77.8 | 1.1 | 8.56 | 64.26 | 45.3 | 786.47 | 5.41 |
| 16c | Example 16c | 66.9 | 1.43 | 8.56 | 74.7 | 72.8 | 784.77 | 5.43 |
| 17c | Example 17c | 189.7 | 1.0419 | 19.76 | 26.36 | 113.8 | 809.76 | 5.65 |
| 18c | Example 18c | 39.7 | 1.4 | 5.56 | 125.8 | 31.5 | 795.9 | 5.63 |
| 20c | Comparative Example 1c | 62.6 | 1.76 | 11.45 | 78.61 | 50 | 776.1 | 5.7 |
| 21c | Comparative Example 2c | 66.9 | 1.35 | 12.19 | 85.2 | 50 | 670.69 | 3.48 |

It may be learned from Table 2-c that:

1. Compared with Comparative Examples 1c and 2c, the negative electrode plate in the examples of the present disclosure not only helps improve the volumetric energy density of the lithium-ion battery, but also effectively suppress expansion of the lithium-ion battery during cycling.
2. Compared with Examples 8c and 9c, when the mass of the first amorphous carbon material in the negative electrode active layer is not less than 28% of the total mass of the first amorphous carbon material and the graphite material, the energy density of the lithium-ion battery is higher, and the expansion rate is also significantly reduced.

In addition, it may also be found from Example 1c that, when the proportion of the first amorphous carbon material is too high, compaction of the amorphous carbon material is relatively low, resulting in a relatively low energy density of the lithium-ion battery.

3. Compared with Examples 12c and 13c, when the ratio of the average particle size of the graphite material to the volume-based particle size of the first amorphous carbon material is (0.95-8.3):1, the compacted density of the negative electrode active layer is improved, so that the lithium-ion battery can have a higher energy density.
4. Compared with Examples 15c and 16c, when the thickness ratio of the negative electrode active layer in the negative electrode plate of the present disclosure to the positive electrode active layer in the lithium-ion battery is within a specific range, the energy density of the lithium-ion battery is further improved.
5. Compared with Examples 17c and 18c, when the unit thickness capacity of the lithium-ion battery in the present disclosure ranges from 26.9 mAh/μm to 123 mAh/μm, both the energy density and the expansion rate of the lithium-ion battery can be improved in some extent.

Test Example 1d

Lithium-ion batteries 1d-17d were obtained after the negative electrode plates in foregoing Examples 1d-15d and Comparative Examples 1d and 2d are assembled respectively according to the method in Test Example 1. Related parameters of the lithium-ion batteries are shown in Table 2-d. The volumetric energy density and the cell expansion rate of the lithium-ion batteries 1d-17d were measured according to the foregoing methods, and the results are shown in Table 2-d.

TABLE 2-d

| | Negative electrode plate | | Positive electrode plate | | |
|---|---|---|---|---|---|
| Lithium-ion battery | Source | Thickness of negative electrode active layer (μm) | Thickness of positive electrode active layer (μm) | Volumetric energy density (Wh/L) | Cell expansion rate (%) |
| 1d | Example 1d | 66.9 | 50 | 822.51 | 3.79 |
| 2d | Example 2d | 66.9 | 50 | 813.53 | 2.15 |
| 3d | Example 3d | 66.9 | 50 | 817.01 | 1.79 |

TABLE 2-d-continued

| Lithium-ion battery | Source | Negative electrode plate: Thickness of negative electrode active layer (μm) | Positive electrode plate: Thickness of positive electrode active layer (μm) | Volumetric energy density (Wh/L) | Cell expansion rate (%) |
|---|---|---|---|---|---|
| 4d | Example 4d | 66.9 | 50 | 819.08 | 1.74 |
| 5d | Example 5d | 66.9 | 50 | 823.06 | 1.78 |
| 6d | Example 6d | 66.9 | 50 | 826.04 | 5.32 |
| 7d | Example 7d | 66.9 | 50 | 817.29 | 5.14 |
| 8d | Example 8d | 72.4 | 50 | 821.57 | 1.73 |
| 9d | Example 9d | 73.3 | 50 | 823.9 | 1.74 |
| 10d | Example 10d | 68.8 | 50 | 817.01 | 1.85 |
| 11d | Example 11d | 69.4 | 50 | 813.53 | 1.82 |
| 12d | Example 12d | 66.9 | 50 | 818.1 | 1.74 |
| 13d | Example 13d | 66.9 | 50 | 818.3 | 5.02 |
| 14d | Example 14d | 77.8 | 45.3 | 792.23 | 1.89 |
| 15d | Example 15d | 59.8 | 65.1 | 784.77 | 1.75 |
| 16d | Comparative Example 1d | 66.9 | 50 | 778.1 | 5.7 |
| 17d | Comparative Example 2d | 89.4 | 50 | 685.8 | 1.85 |

It may be learned from Table 2-d that:

1. Compared with Comparative Examples 1d and 2d, the negative electrode plate in the examples of the present disclosure helps improve the volumetric energy density of the lithium-ion battery, and effectively suppress expansion of the lithium-ion battery during cycling.
2. Compared with Examples 6d and 7d, when the thickness $H_1$ of the first amorphous carbon layer, the thickness $H_2$ of the graphite layer, the maximum particle size $D_1$ of the first amorphous carbon material, and the maximum particle size $D_2$ of the graphite material satisfy $(H_1+H_2)-0.39D_2 \geq H_1 \geq 0.63D_1$, expansion of the lithium-ion battery during cycling may be obviously suppressed.
3. Compared with Examples 14d and 15d, when the thickness ratio of the negative electrode active layer in the negative electrode plate of the present disclosure to the positive electrode active layer in the lithium-ion battery is within a specific range, the energy density of the lithium-ion battery is further improved.

Test Example 1e

Lithium-ion batteries 1d-16e were obtained after the negative electrode plates in foregoing Examples 1d-15e and Comparative Example 1e are assembled respectively according to the method in Test Example 1. Related parameters of the lithium-ion batteries are shown in Table 2-e. The volumetric energy density and the cell expansion rate of the lithium-ion batteries 1e-17e were measured according to the foregoing methods, and the results are shown in Table 2-e.

TABLE 2-e

| Lithium-ion battery | Source | Negative electrode plate: Thickness of negative electrode active layer (μm) | Positive electrode plate: Thickness of positive electrode active layer (μm) | Volumetric energy density (Wh/L) | Cell expansion rate (%) |
|---|---|---|---|---|---|
| 1e | Example 1e | 68.5 | 50 | 819.07 | 1.31 |
| 2e | Example 2e | 66.3 | 50 | 831.93 | 2.46 |
| 3e | Example 3e | 63.2 | 50 | 850.42 | 3.98 |
| 4e | Example 4e | 57.9 | 50 | 884.91 | 4.52 |
| 5e | Example 5e | 50.2 | 50 | 890.35 | 5.78 |
| 6e | Example 6e | 69.5 | 50 | 813.14 | 1.01 |
| 7e | Example 7e | 66.3 | 50 | 817.54 | 2.47 |
| 8e | Example 8e | 68.7 | 50 | 831.93 | 2.36 |
| 9e | Example 9e | 71 | 50 | 804.9 | 2.41 |
| 10e | Example 10e | 79.6 | 50 | 759.24 | 2.37 |
| 11e | Example 11e | 64.3 | 50 | 832.03 | 2.18 |
| 12e | Example 12e | 63.2 | 50 | 850.61 | 3.25 |
| 13e | Example 13e | 38.65 | 50 | 890.3 | 5.64 |
| 14e | Example 14e | 95.4 | 50 | 688.03 | 1.25 |
| 15e | Example 15e | 38.6 | 50 | 883.2 | 5.45 |
| 16e | Comparative Example 1e | 129.3 | 50 | 572.84 | 2.51 |

It may be learned from Table 2-e that: Compared with Comparative Example 1e, the negative electrode plate in the examples of the present disclosure not only helps improve the volumetric energy density of the lithium-ion battery, but also can effectively suppress expansion of the lithium-ion battery during cycling.

In conclusion, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of the present disclosure.

What is claimed is:

1. A negative electrode plate, comprising a current collector and a negative electrode active layer disposed on at least one function surface of the current collector, wherein a negative electrode active material of the negative electrode active layer comprises a first amorphous carbon material; and an interlayer spacing d002 of the first amorphous carbon material is greater than 0.34 nm, and an average pore diameter of pores of the first amorphous carbon material ranges from 2 nm to 20 nm;

the negative electrode active layer comprises a first amorphous carbon layer and a silicon-based active layer that are stacked, the first amorphous carbon layer comprises the first amorphous carbon material, and the silicon-based active layer comprises a silicon-based material; a thickness $H_1$ of the first amorphous carbon layer and a thickness $H_4$ of the silicon-based active layer satisfy the following relationship:

$$H_4 \leq 0.2(H_1+H_4); \text{ and}$$

the silicon-based material is selected from at least one of a silicon material, a silicon oxide material, and a silicon-carbon composite material.

2. The negative electrode plate according to claim 1, wherein capacity per gram of the first amorphous carbon material is not less than 470 mAh/g; and/or an average particle size d1 of the first amorphous carbon material ranges from 3 μm to 15 μm; and/or a specific surface area of the first amorphous carbon material ranges from 2.8 $m^2/g$ to 19 $m^2/g$; and/or a Raman spectrum Id/Ig peak ratio of the first amorphous carbon material is greater than 1.0; and/or an X-ray diffraction pattern of the first amorphous carbon material comprises a diffraction peak with 2θ being less than 26 degrees, and an intensity of the diffraction peak is less than 20000; and/or, a full width at half maximum of the diffraction peak is greater than 1.2 degrees.

3. The negative electrode plate according to claim 1, wherein the negative electrode active material further comprises a second amorphous carbon material, and the second amorphous carbon material is in a shape of spherical particles; and an average particle size d2 of the spherical particles ranges from 0.2 μm to 4 μm; and/or, a specific surface area of the second amorphous carbon material ranges from 2 $m^2/g$ to 23 $m^2/g$.

4. The negative electrode plate according to claim 3, wherein the negative electrode active material comprises a mixture of the first amorphous carbon material and the second amorphous carbon material.

5. The negative electrode plate according to claim 4, wherein a mass percentage of the second amorphous carbon material in the mixture is not less than 3%.

6. The negative electrode plate according to claim 3, wherein the negative electrode active layer comprises a first amorphous carbon layer and a second amorphous carbon layer that are stacked, the first amorphous carbon layer comprises the first amorphous carbon material, and the second amorphous carbon layer comprises the second amorphous carbon material.

7. The negative electrode plate according to claim 6, wherein the negative electrode active layer comprises the first amorphous carbon layer close to the current collector and the second amorphous carbon layer away from the current collector.

8. The negative electrode plate according to claim 7, wherein a thickness $H_1$ of the first amorphous carbon layer and a thickness $H_2$ of the second amorphous carbon layer satisfy the following relationship:

$$0.3(H_1+H_2) \geq H_2 \geq D_2$$

wherein $D_2$ denotes a maximum particle size of the second amorphous carbon material.

9. The negative electrode plate according to claim 1, wherein the negative electrode active material comprises a mixture of the first amorphous carbon material and a graphite material.

10. The negative electrode plate according to claim 9, wherein a ratio of an average particle size d3 of the graphite material to an average particle size $d_1$ of the first amorphous carbon material is (0.95-8.3):1; and/or a mass percentage of the first amorphous carbon material in the mixture is not less than 28%.

11. The negative electrode plate according to claim 1, wherein the negative electrode active layer comprises a first amorphous carbon layer and a graphite layer that are stacked, the first amorphous carbon layer comprises the first amorphous carbon material, and the graphite layer comprises a graphite material.

12. The negative electrode plate according to claim 11, wherein a thickness $H_1$ of the first amorphous carbon layer and a thickness $H_3$ of the graphite layer satisfy the following relationship:

$$(H_1+H_3)-0.39D_3 \geq H_1 \geq 0.63D_1$$

wherein $D_1$ denotes a maximum particle size of the first amorphous carbon material, and $D_3$ denotes a maximum particle size of the graphite material.

13. The negative electrode plate according to claim 11, wherein the negative electrode active layer comprises the graphite layer close to the current collector and the first amorphous carbon layer away from the current collector.

14. The negative electrode plate according to claim 9, wherein the graphite material comprises graphite particles and/or graphite core-shell particles, and the graphite core-shell particles are constituted by a core formed by graphite and a shell covering at least part of a surface of the core.

15. The negative electrode plate according to claim 1, wherein the negative electrode active material comprises a mixture of the first amorphous carbon material and a silicon-based material.

16. The negative electrode plate according to claim 15, wherein a mass percentage of the silicon-based material in the mixture ranges from 0.3% to 20%.

17. An electrochemical energy storage apparatus, comprising the negative electrode plate according to claim 1.

18. The electrochemical energy storage apparatus according to claim 17, wherein a unit thickness capacity of the negative electrode plate ranges from 26.9 mAh/μm to 123 mAh/μm.

19. The electrochemical energy storage apparatus according to claim 17, wherein the electrochemical energy storage apparatus further comprises a positive electrode plate, and a thickness ratio of a negative electrode active layer of the negative electrode plate to a positive electrode active layer of the positive electrode plate is (0.93-1.68):1.

20. An electronic apparatus, comprising the electrochemical energy storage apparatus according to claim 17.

* * * * *